(12) United States Patent
Holzgrafe et al.

(10) Patent No.: US 12,353,071 B1
(45) Date of Patent: Jul. 8, 2025

(54) MULTILAYER THIN FILM LITHIUM-CONTAINING OPTICAL DEVICES

(71) Applicant: HyperLight Corporation, Cambridge, MA (US)

(72) Inventors: Jeffrey Cole Holzgrafe, Somerville, MA (US); Miles Matthew Kovach, Cambridge, MA (US); Christian Reimer, Wellesley, MA (US); Mian Zhang, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 18/991,092

(22) Filed: Dec. 20, 2024

Related U.S. Application Data

(60) Provisional application No. 63/613,580, filed on Dec. 21, 2023.

(51) Int. Cl.
*G02F 1/035* (2006.01)

(52) U.S. Cl.
CPC .......... *G02F 1/035* (2013.01); *G02F 2201/05* (2013.01); *G02F 2201/063* (2013.01); *G02F 2201/066* (2013.01); *G02F 2201/302* (2013.01); *G02F 2202/20* (2013.01)

(58) Field of Classification Search
CPC .. G02B 2006/12097; G02B 2006/1204; G02B 2006/12045; G02B 2006/12142; G02F 2202/20; G02F 2201/063
USPC .................... 385/1–3, 14, 130–132
See application file for complete search history.

(56) References Cited

U.S. PATENT DOCUMENTS

| | | | |
|---|---|---|---|
| 4,999,686 A | 3/1991 | Autier | |
| 7,529,455 B2 | 5/2009 | Suzuki | |
| 8,913,860 B2 * | 12/2014 | Ushida | G02B 6/305 |
| | | | 385/131 |
| 10,816,727 B1 * | 10/2020 | Bian | G02B 6/136 |
| 11,681,167 B2 | 6/2023 | Thomas | |

(Continued)

FOREIGN PATENT DOCUMENTS

| | | | | |
|---|---|---|---|---|
| CN | 112630885 | * | 4/2021 | ............. G02B 6/126 |
| CN | 112782805 | | 5/2021 | |

(Continued)

OTHER PUBLICATIONS

Chen et al., High-efficiency thin-film lithium niobate modulator with highly confined optical modes, Optics Letters, vol. 48, No. 7, Apr. 1, 2023, pp. 1602-1605.

(Continued)

*Primary Examiner* — Robert Tavlykaev
(74) *Attorney, Agent, or Firm* — Van Pelt, Yi & James LLP

(57) ABSTRACT

An electro-optic device includes a substrate structure, a first layer, a second layer on the first layer, and a third layer on the second layer. The first layer includes a first thin film lithium-containing (TFLC) electro-optic material and having a first thickness. The second layer includes a second TFLC electro-optic material and has a second thickness. The third layer includes a third TFLC electro-optic material and having a third thickness. Electro-optic structure(s) of the electro-optic device includes the first layer, the second layer, and the third layer. In the electro-optic structure(s), the first layer has a first width, the second layer has a second width, and the third layer has a third width.

19 Claims, 11 Drawing Sheets

(56) References Cited

U.S. PATENT DOCUMENTS

| | | | |
|---|---|---|---|
| 2011/0170825 A1* | 7/2011 | Spector | G02B 6/136 438/31 |
| 2015/0277042 A1* | 10/2015 | Goodwill | H04B 10/60 385/11 |
| 2020/0335945 A1 | 10/2020 | Clifton | |
| 2021/0255489 A1 | 8/2021 | Wang | |
| 2022/0026634 A1 | 1/2022 | Bahadori | |
| 2022/0252783 A1* | 8/2022 | Zhang | G02B 6/1228 |
| 2023/0083232 A1* | 3/2023 | Toda | G02B 6/125 385/43 |
| 2024/0329306 A1* | 10/2024 | Kodama | G02B 6/122 |
| 2024/0329323 A1 | 10/2024 | Shimura | |
| 2024/0377594 A1* | 11/2024 | Oka | G02B 6/028 |

FOREIGN PATENT DOCUMENTS

| | | | | |
|---|---|---|---|---|
| CN | 112835214 | | 5/2021 | |
| CN | 112596161 | * | 3/2023 | G02B 6/122 |
| CN | 115877506 | * | 3/2023 | G02B 6/122 |
| CN | 116819682 | | 9/2023 | |
| CN | 116908962 | | 10/2023 | |
| CN | 117092749 | | 11/2023 | |
| JP | 2015090450 | | 5/2015 | |
| JP | 2017-215526 | * | 12/2017 | G02B 6/122 |
| WO | 2023054526 | | 4/2023 | |

OTHER PUBLICATIONS

He et al., Low-loss fiber-to-chip interface for lithium niobate photonic integrated circuits, Feb. 24, 2019, 5pgs.

Li et al., High density lithium niobate photonic integrated circuits, Nature Communications, Aug. 10, 2023, pp. 1-8.

Roeloffzen et al., Low-Loss Si3N4 TriPleX Optical Waveguides: Technology and Applications Overview, IEEE Journal of Selected Topics in Quantum Electronics, vol. 24, No. 4, Jul./Aug. 2018, pp. 4400321-4400321.

Sacher et al., Tri-layer silicon nitride-on-silicon photonic platform for ultra-low-loss crossings and interlayer transitions, vol. 25, No. 25, Dec. 11, 2017, pp. 30862-30875.

Valdez et al., 110 GHz, 110 mW hybrid silicon-lithium niobate Mach-Zehnder modulator, Scientific Reports, 2022, pp. 1-11.

Watanabe et al., Perpendicular Grating Coupler Based on a Blazed Antiback-Reflection Structure, Journal of Lightwave Technology, vol. 35, No. 21, Nov. 1, 2017, pp. 4663-4669.

* cited by examiner

MULTILAYER THIN FILM LITHIUM-CONTAINING OPTICAL DEVICES

CROSS REFERENCE TO OTHER APPLICATIONS

This application claims priority to U.S. Provisional Patent Application No. 63/613,580 entitled MULTILAYER THIN FILM LITHIUM-CONTAINING OPTICAL DEVICES filed Dec. 21, 2023 which is incorporated herein by reference for all purposes.

BACKGROUND OF THE INVENTION

Photonics devices, such as electro-optic devices, contain multiple optical components. For example, a single photonics device may include fiber-to-chip couplers, waveguides, optical modulators, polarization rotation beam splitter/combiners, waveguide bends, mode converters, and/or other structures. Some of these optical components include other structures. For example, an optical modulator may include electrodes carrying electric signal(s) that modulate the optical signal (e.g., through the electro-optic effect) in addition to the waveguide that carries the optical signal. As a result, the optical modulator can modulate the phase, intensity and/or polarization of the optical signal traversing the waveguide.

Photonics devices are also desired to meet certain performance benchmarks. The overall performance of the photonics device is affected by the performance of its constituents. For example, a photonics device may include an optical modulator, waveguides carrying the optical signal to and from (and within) the optical modulator, mode converters, and input/output couplers for coupling the optical signal into and out of the photonics device. The optical modulator may be desired to provide a sufficient electro-optic modulation at lower electrode driving voltages, have low optical losses, low microwave (i.e., electrical) losses, and consume a small total area. The waveguides are desired have low losses and be capable of directing the optical signal in the desired path. The input and output couplers may be desired to optically couple to another device, such as an optical fiber, with low losses. For some photonics devices, the structures within the photonics device may have very different requirements for the desired performance. For example, a waveguide may be desired to have a confined optical mode for transmitting the signal. However, an output coupler that is coupling an optical signal into a fiber is desired to have the mode expanded. Consequently, techniques for optimizing the performance of various components within a photonics device are desired.

BRIEF DESCRIPTION OF THE DRAWINGS

Various embodiments of the invention are disclosed in the following detailed description and the accompanying drawings.

DETAILED DESCRIPTION

Figure 1A:
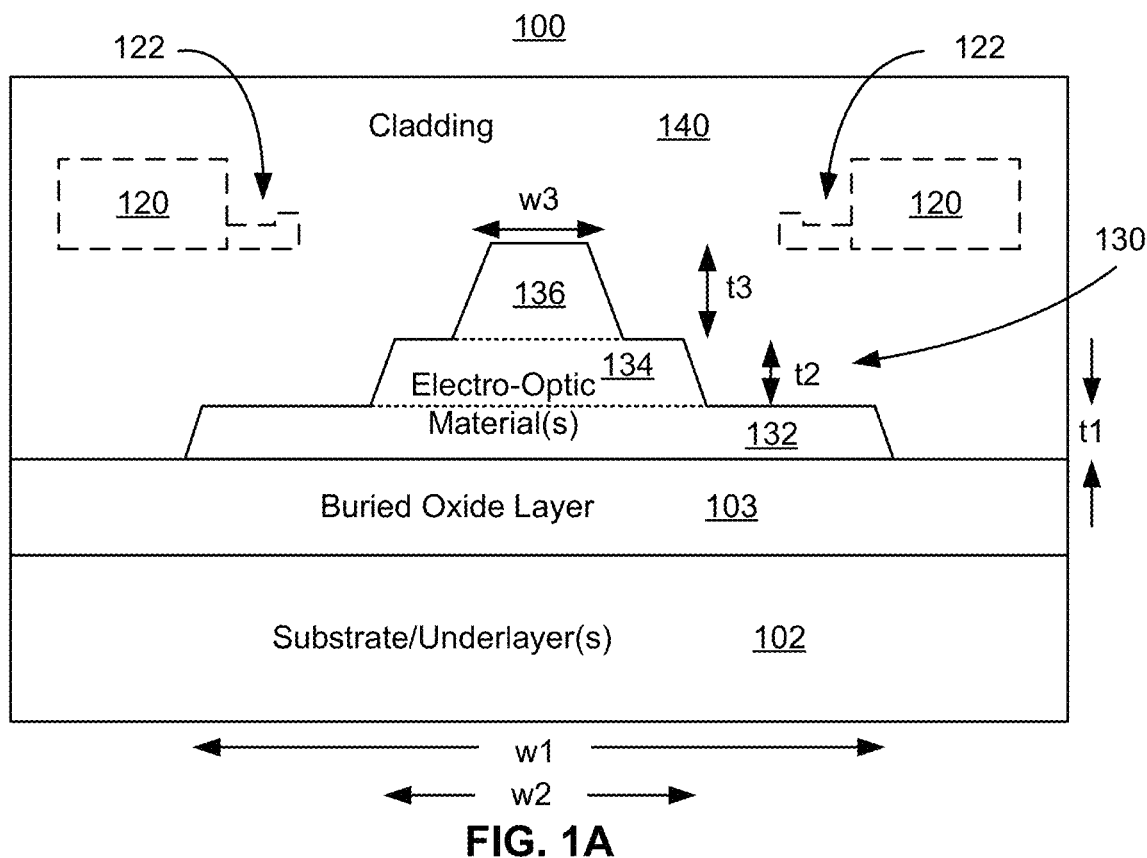
FIGS. 1A-1B depict an embodiment of an electro-optic device that may have improved device performance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Photonics devices, such as electro-optic devices, may include a variety of optical components. Moreover, performance of such photonics devices is desired to be improved. The overall performance of the photonics device is affected by the performance of its components. Further, the structures within the photonics device may have widely different configurations for the desired performance. In addition, the performance each structure depends on fabrication stack parameters, and particularly on the thickness of the waveguiding material. It has been determined that typical fabrication processes and typical optical devices only allow for one or two different waveguide layer thicknesses, requiring performance tradeoffs between components. Thus, performance of electro-optic devices is desired to be improved.

An electro-optic device includes a substrate structure, a first layer, a second layer on the first layer, and a third layer on the second layer. The first layer includes a first thin film lithium-containing (TFLC) electro-optic material and having a first thickness. The second layer includes a second TFLC electro-optic material and has a second thickness. The third layer includes a third TFLC electro-optic material and having a third thickness. Electro-optic structure(s) of the electro-optic device includes the first layer, the second layer, and the third layer. In the electro-optic structure(s), the first layer has a first width, the second layer has a second width, and the third layer has a third width.

In some embodiments, the first layer has a first thickness of at least fifty nanometers and not more than three hundred and fifty nanometers. The second layer has a second thickness of at least two hundred and fifty nanometers and not more than five hundred nanometers. The third layer has a third thickness of at least three hundred and fifty nanometers and not more than 1.2 micrometers. In some such embodiments, the first, second, and third TFLC electro-optic materials each includes at least one of thin film lithium niobate and thin film lithium tantalate.

In some embodiments, the electro-optic device also includes dielectric layer(s) that may be between the first layer and the second layer and/or between the second layer and the third layer. In some embodiments, the electro-optic structure(s) includes a waveguide, a grating having a plurality of teeth, a mode converter, and/or a multi-mode interference coupler.

In some embodiments, the electro-optic structure(s) includes the waveguide. In such embodiments, the third width is less than the second width and the second width is less than the first width. In some such embodiments, the waveguide is a rib waveguide and wherein the first layer corresponds to a trench adjacent to the waveguide. The electro-optic device may also include an electrode. A portion of the electrode is proximate to a portion of the waveguide. In some such embodiments, the first layer extends to the electrode for at least the portion of the waveguide proximate to the electrode. In some such embodiments, the third layer has the third thickness for the portion of the waveguide and a fourth thickness distal from the portion of the waveguide. The third thickness is greater than the fourth thickness and is at least five hundred nanometers and not more than eight hundred nanometers. In some embodiments, the waveguide includes a first portion having the first layer, the second layer, and the third layer. The waveguide also includes a second portion having only the first layer and the second layer. in some embodiments, a portion of the waveguide is configured with a bend having a bending radius of less than forty micrometers and greater than ten micrometers. In such embodiments, the first width is not more than one micrometer greater than the second width at the bend.

In some embodiments, a portion of the waveguide is configured with a bend and the third layer is omitted at the bend. In some embodiments, the electro-optic structure(s) is the grating. In some such embodiments, the second layer has a central axis. The third layer is offset from the central axis. In some embodiments, the electro-optic structure(s) includes an aperture extending through at least the first layer. The electro-optic device may also include additional electro-optic structure(s). The additional electro-optic structure(s) may include only the first layer and the second layer or may include only the first layer.

An electro-optic device that includes a substrate structure, a first electro-optic structure, and a second electro-optic structure is described. The first electro-optic structure is on the substrate structure. The first electro-optic structure includes a first layer, a second layer on the first layer, and a third layer on the second layer. The first layer includes a first thin film lithium-containing (TFLC) electro-optic material having a first thickness. The second layer includes a second TFLC electro-optic material and having a second thickness. The third layer includes a third TFLC electro-optic material and having a third thickness. The second electro-optic structure is on the substrate structure and includes the first layer and at least a portion of the second layer but omits the third layer. In some embodiments, the electro-optic device also includes a third electro-optic structure on the substrate structure. The third electro-optic structure includes at least a portion of the first layer but omits the second and third layers.

A method is described. The method includes providing a first electro-optic structure from at least one lithium-containing electro-optic layer on a substrate structure. Providing the first electro-optic structure includes performing at least three etches of the lithium-containing electro-optic layer(s) such that the first electro-optic structure includes a first layer, a second layer on the first layer, and a third layer on the second layer. The first layer includes a first thin film lithium-containing (TFLC) electro-optic material having a first thickness. The second layer includes a second TFLC electro-optic material and having a second thickness. The third layer includes a third TFLC electro-optic material and having a third thickness. The lithium-containing electro-optic layer(s) includes the first TFLC electro-optic material, the second TFLC electro-optic material, and the third TFLC electro-optic material. In the electro-optic structure(s), the first layer has a first width, the second layer has a second width, and the third layer has a third width. In some embodiments, the first, second, and third TFLC electro-optic materials are the same. In some embodiments, the method may also provide dielectric layer(s) between the first layer and the second layer and/or between the second layer and the third layer.

Various features of the electro-optic devices are described herein. One or more of these features may be combined in manners not explicitly described herein. The optical devices described herein may be formed using electro-optic materials, such as thin film lithium containing (TFLC) electro-optical materials. For example, thin film lithium niobate (TFLN) and/or thin film lithium tantalate (TFLT) may be used for the components described. Although primarily described in the context of TFLC electro-optic materials, such as TFLN and TFLT, other nonlinear optical materials may be used in the optical devices described herein. For example, other ferroelectric nonlinear (e.g. second order) optical materials may also be desired to be used in, e.g., waveguides, modulators, polarization rotators, and/or mode converters. Such ferroelectric nonlinear optical materials may include but are not limited to potassium niobate (e.g. $KNbO_3$), gallium arsenide (GaAs), potassium titanyl phosphate (KTP), lead zirconate titanate (PZT), and barium titanate ($BaTiO_3$). The techniques described may also be used for other nonlinear ferroelectric optical materials, particularly those which may otherwise be challenging to fabricate. For example, such nonlinear ferroelectric optical materials may have inert chemical etching reactions using conventional etching chemicals such as fluorine, chlorine or bromine compounds.

In some embodiments, the optical material(s) used are nonlinear. As used herein, a nonlinear optical material exhibits the electro-optic effect and has an effect that is at least (e.g. greater than or equal to) 5 picometer/volt. In some embodiments, the nonlinear optical material has an effect that is at least 10 picometer/volt. In some such embodiments nonlinear optical material has an effect of at least 20 picometer/volt. The nonlinear optical material experiences a change in index of refraction in response to an applied electric field. In some embodiments, the nonlinear optical material is ferroelectric. In some embodiments, the electro-optic material effect includes a change in index of refraction in an applied electric field due to the Pockels effect. Thus, in some embodiments, optical materials possessing the electro-optic effect in one or more the ranges described herein are considered nonlinear optical materials regardless of whether the effect is linearly or nonlinearly dependent on the applied electric field. The nonlinear optical material may be a non-centrosymmetric material. Therefore, the nonlinear optical material may be piezoelectric. Such nonlinear optical materials may have inert chemical etching reactions for conventional etching using chemicals such as fluorine, chlorine or bromine compounds. In some embodiments, the nonlinear optical material(s) include one or more of LN, LT, potassium niobate, gallium arsenide, potassium titanyl phosphate, lead zirconate titanate, and barium titanate. In other embodiments, other nonlinear optical materials having analogous optical characteristics may be used.

In some embodiments, waveguides and other structures described herein are low optical loss optical structures. For example, a waveguide may have a total optical loss of not more than 10 dB through the portion of waveguide (e.g. when biased at maximum transmission and as a maximum loss) in proximity to electrodes used in modulating the optical signal. The total optical loss is the optical loss in a waveguide through a single continuous electrode region (e.g. as opposed to multiple devices cascaded together). In some embodiments, the waveguide has a total optical loss of not more than 8 dB. In some embodiments, the total optical loss is not more than 4 dB. In some embodiments, the total optical loss is less than 3 dB. In some embodiments, the total optical loss is less than 2 dB. In some embodiments, the waveguide has an optical loss of not more than 3 dB/cm (e.g. on average). In some embodiments, the nonlinear material(s) in the waveguides has an optical loss of not more than 2.0 dB/cm. In some such embodiments, the waveguide has an optical loss of not more than 1.0 dB/cm. In some embodiments, the waveguide has an optical loss of not more than 0.5 dB/cm. In some embodiments, the low optical losses are associated with a low surface roughness of the side walls of the waveguides.

The waveguides and other optical structures may have improved surface roughness. For example, the short range root mean square surface roughness of a sidewall of the rib may be less than ten nanometers. In some embodiments, this root mean square surface roughness is not more than five nanometers. In some cases, the short range root mean square surface roughness does not exceed two nanometers. In some embodiments, a waveguide includes a rib portion and a slab portion. The height of such a rib portion is selected to provide a confinement of the optical mode such that there is a 10 dB reduction in intensity from the intensity at the center of the rib at ten micrometers from the center of the rib. For example, the height of the rib is on the order of a few hundred nanometers in some cases. However, other heights are possible in other embodiments. Various other optical components may be incorporated into the waveguide to provide the desired functionality. For example, the waveguide may have wider portion(s) for accommodating multiple modes or performing other functions.

The improved surface roughness of waveguides (and other structures described herein) formed of TFLC electro-optic material(s) may be fabricated utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. Waveguide and other structures formed of the electro-optic material(s) may have improved surface roughness.

Figure 1B:
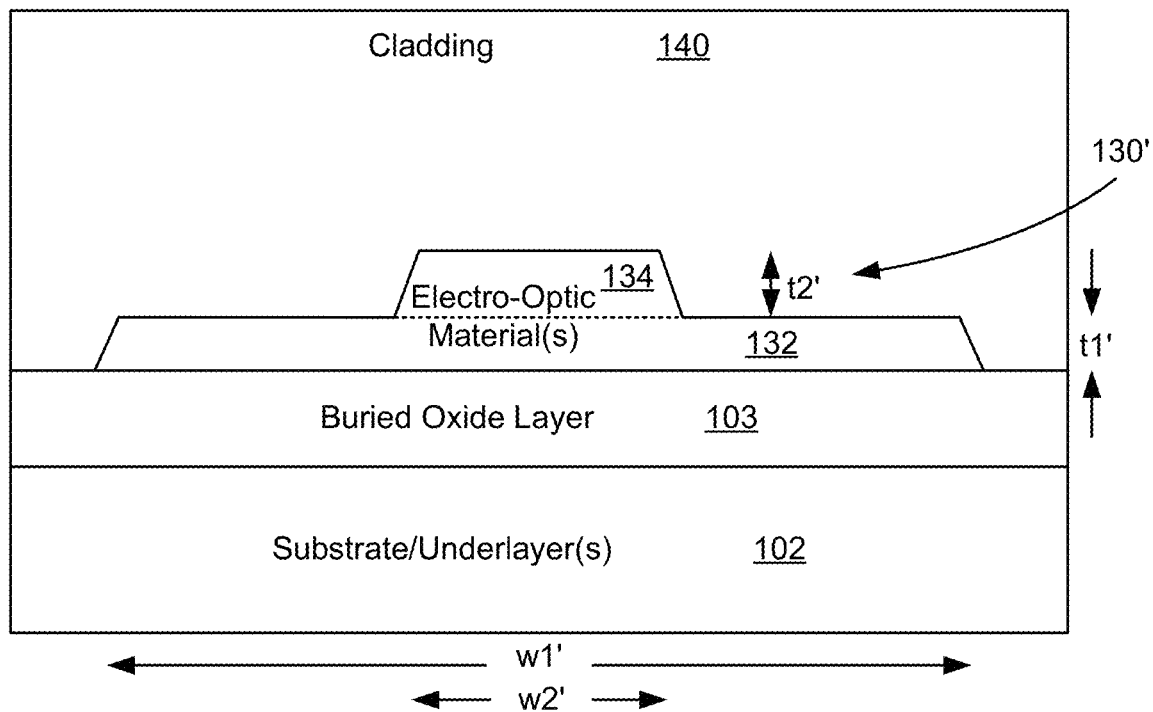

FIGS. 1A-1B depict an embodiment of electro-optic device 100 that may have improved device performance. FIGS. 1A and 1B are not to scale. FIG. 1A is a cross-sectional view of electro-optic device 100 at one region that includes electro-optic structure 130. FIG. 1B depicts a cross-sectional view of electro-optic device 100 at another region that includes electro-optic structure 130'. Electro-optic device 100 may include other and/or additional structures that are not shown for simplicity. Electro-optic structures 130 and 130' are on a substrate structure that includes a substrate 102 and a buried oxide (BOX) layer 103. In some embodiments, substrate 102 is a silicon substrate. Substrate 102 may also include other layers. Substrate 102 may be one hundred micrometers or more thick. BOX layer 103 may be a silicon dioxide layer. In some embodiments, BOX layer 103 may be at least three micrometers thick and not more than fifteen micrometers thick. In some embodiments, BOX layer 103 is not more than ten micrometers thick. In some embodiments, BOX layer 103 is at least five micrometers thick. Further, other geometric configurations of substrate 102 and/or BOX layer 103 may be used in some embodiments. Also shown is cladding 140, which may be formed of silicon dioxide.

Referring to FIG. 1A, electro-optic structure 130 includes layers 132, 134, and 136 of electro-optic material(s). In some embodiments, layers 132, 134, and 136 are TFLC electro-optic materials, such as TFLN and/or TFLT. However, other embodiments, other and/or additional electro-optic material(s) may be used. In some embodiments, all of layers 132, 134, and 136 are formed of the same material. Layers 132, 134, and 136 may be formed from a single, thicker layer (e.g. having thickness greater than or equal to t1+t2+t3). For example, multiple etching process may form layers 132, 134, and 136. In other embodiments, each layer 132, 134, and 136 may be a different electro-optic material. In other embodiments, two layers may be the same electro-optic layer, while the third is a different electro-optic layer. Layer 132 has a thickness t1 and a width w1. Layer 134 has a thickness t2 and a width w2. Layer 136 has a thickness t3 and a width w3. In the embodiment shown, w3≤w2≤w1. The thicknesses and/or widths of layers 132, 134, and 136 may be the same or different. The thickness and width of each of layers 132, 134, and 136 are configured for the specific functions of electro-optic structure 130.

In some embodiments, electro-optic structure 130 may be configured as a modulator (or portion of a modulator). Thus, electrodes 120 are shown by dashed lines. In the embodiment shown, electrodes 120 may include extensions 122. Embodiments of analogous electrodes may be found in co-pending U.S. patent application Ser. No. 17/843,906, entitled ELECTRO-OPTIC DEVICES HAVING ENGINEERED ELECTRODES, which is a continuation of U.S. patent application Ser. No. 17/102,047 entitled ELECTRO-OPTIC DEVICES HAVING ENGINEERED ELECTRODES, filed Nov. 23, 2020, which claims priority to U.S. Provisional Patent Application No. 62/941,139 entitled THIN-FILM ELECTRO-OPTIC MODULATORS filed Nov. 27, 2019, U.S. Provisional Patent Application No. 63/033,666 entitled HIGH PERFORMANCE OPTICAL MODULATORS filed Jun. 2, 2020, and U.S. Provisional Patent Application No. 63/112,867 entitled BREAKING VOLTAGE-BANDWIDTH LIMIT IN INTEGRATED LITHIUM NIOBATE MODULATORS USING MICRO-STRUCTURED ELECTRODES filed Nov. 12, 2020, all of which are incorporated herein by reference for all purposes. In other embodiments, extensions 122 may be omitted. Electrodes 120 may carry differential electrical signals, a single electrical signal (e.g. a signal and ground), or other signal(s). In some embodiments, layer 132 extends at least to electrodes 120. In such embodiments, layer 132 may direct the electric field due to electrodes 120 toward the rib including layers 134 and 136. Thus, coupling between electrodes 120 and electro-optic structure 130 may be improved.

Referring to FIG. 1B, electro-optic structure 130' includes layers 132 and 134. Electro-optic structure 130' may be located at another portion of electro-optic device 100 than electro-optic structure 130. Because electro-optic structure 130' has a different function than electro-optic structure 130, its configuration is different. Layers 132 and 134 of electro-optic structure 130' are the same layers as used in electro-optic structure 130. However, because of differences in fabrication, layer 136 has been omitted from electro-optic structure 130'. In some embodiments, layer 136 has been removed, for example via an RIE, another etch process, and/or another removal process. Layer 132 has a thickness t1' and a width w1'. Layer 134 has a thickness t2' and a width w2'. The thicknesses (t1' and t2') and/or widths (w1' and w2') of layers 132 and 134 may be the same or different. Width w2' and a thickness t2' may (but need not) differ from thickness t2 and width w2. Similarly, layer 132 has thickness t1' and width w1', which may (but need not) differ from thickness t1 and width w1. The thickness and width of each of layers 132 and 134 are configured for the specific functions of electro-optic structure 130'. For example, w3 may be on the order of 100 micrometers. In the embodiment shown w2≤ w1. However, other widths w1, w2, w3, w2', and/or w3' are possible. Layers 132, 134, and 136 are shown as etched through to buried oxide layer 103. In some embodiments, however, layer 132, 134, and/or 136 may not be etched through. For example, layer 132 may extend to the edges of electro-optic device 100.

In some embodiments, the thickness t3 of layer 136 is at least three hundred and fifty nanometers and not more than 1.2 micrometers. Such a geometry for layer 136 may provide a high degree of optical confinement. For example, such a configuration may be tailored for the performance of the electro-optic modulator components and low-loss straight waveguide sections. Stated differently, electro-optic modulator components (e.g., the portion of the waveguide between electrodes such as electrodes 120) and/or low-loss straight waveguide sections might include layers 132, 134 and 136 in a configuration analogous to electro-optic structure 130.

In some embodiments, second layer 134 has a thickness (t2 and/or t2') of at least two hundred and fifty nanometers and not more than five hundred nanometers. Such a layer 134 may provide moderate confinement. Layer 134 may provide particularly convenient mode coupling between TM0 and TE1 optical modes. Layer 134 may thus be useful for creating polarization control device components. Layer 134 may also eliminate undesired TE0-TM0 mode conversion inside of bends that can be present in thicker layers. Layer 134 may be the top layer for structure such as polarization control structures and bends of the waveguide for which TE0 and TM0 mode conversion is desired to be avoided. Thus, electro-optic structure 130' or an analogous structure may be used in a polarization control structure and/or at waveguide bends for which TE0 and TM0 mode conversion is reduced or eliminated.

First layer 132 may have a thickness (t1 and/or t1') of at least fifty nanometers and not more than three hundred and fifty nanometers. Such a layer 132 may provide weak optical confinement. As such, layer 132 may be particularly useful in electro-optic structures for which low-loss coupling to conventional optical fiber modes is desired. For example, layer 132 may be the top (or only) layer in optical couplers configured used in coupling the optical signal into or out of electro-optic device 100 from or to an optical fiber. In some embodiments, layers 132, 134, and/or 136 may have other thicknesses. For example, in some embodiments, each of layers 132, 134, and 136 may have a thickness of at least fifty nanometers and not more than two hundred and fifty nanometers (i.e. t1=t2=t3 and 50 nm≤t1≤250 nm). In such embodiments, the total thickness of electro-optic structure 130 is at least one hundred and fifty nanometers and not more than seven hundred and fifty nanometers (i.e. t1+t2+t3). In such embodiments, the three layer electro-optic structure 130 may still provide the desired optical confinement because of the total thickness of electro-optic structure 130.

Electro-optic structures 130 and 130' may be optically connected through one or more layers 132, 134, and 136. Thus, electro-optic structure 130 and 130' might be considered part of the same waveguide. For example, electro-optic structure 130 (e.g., configured as a straight waveguide) may be directly coupled to electro-optic structure 130' (e.g., for a bend). Layer 136 is simply removed between electro-optic structure 130 and electro-optic structure 130'. An optical signal carried by electro-optic structure 130 is transmitted to electro-optic structure 130'. In some embodiments, layer(s) 132, 134, and/or 136 may be configured to perform other operations on the optical signal traveling between electro-optic structures 130 and 130'. For example, a mode converter, another optical modulator, other bends, and/or other structures may be formed from layers 132, 134, and 136. Thus, at least one of layers 132, 134, and 136 exists along the path of the optical signal. The number and configuration of layer(s) 132, 134, and/or 136 depends upon the processing desired for the optical signal(s) being transmitted through electro-optic device 100. Further, although three layers 132, 134, and 136 of electro-optic material are shown, four or more layers may be present, depending upon the application for which electro-optic structure 130 is desired. Thus, the desired geometry for each layer 132, 134, 136, and/or additional electro-optic material containing layer(s) may be provided to achieve the desired functions for electro-optic device 100.

Electro-optic device 100 thus includes electro-optic structure(s), such as electro-optic structure 130, having three (or more) layers 132, 134, and 136. Other structures within electro-optic device, such as electro-optic structure 130', may have fewer (or more) layers of the electro-optic material(s). Widths w1, w2, w3, w1', and w2' of, thicknesses t1, t2, t3, t1', and t2' of, and presence of layers 132, 134, and 136 for each electro-optic structure may be tailored for the particular functions for which electro-optic structures 130 and/or 130' are desired. Thus, although described in terms of particular thicknesses and widths, other thicknesses and/or widths are possible. For example, by tailing electro-optic (e.g. TFLC) layers 132, 134, and 136, the optical signal carried by one or more layers 132, 134, and/or 136 may be moved further from substrate 102 (where more layers 132, 134, and 136 are present), or closer to substrate 102 (where fewer layers of 132, 134, and 136 are present). Low-loss optical transitions between the different layers 132, 134, and 136 and thicknesses may be provided. Each device component formed may have a different waveguide thickness (e.g., a different number of layers or portions of layers), tailored for the component. For example, the thickness may be optimized for some or all performance characteristics of the device. Stated differently, each component may have a thickness optimized for its performance characteristics. In addition, the mode shape, conversion between modes, confinement of the modes, losses, polarization, and/or other characteristics of optical signal transmission may be better controlled through the use of multiple tailored layers 132, 134, and 136 which are tailored for the various components within electro-optic device 100.

For example, it has also been determined that for a given optical loss limit (e.g. 0.1 dB/cm), a thicker TFLN layer provides lower V-pi. Stated differently, electro-optic structure 130 may be lower loss than an electro-optic structure having the same width and which only includes layers 132 and 134. The lower V-pi is due to the improved (i.e., tighter) confinement of the optical mode is for a thicker waveguide including layer 136. The better optical confinement increases the electro-optical mode overlap because more of the optical field is inside the electro-optically active TFLC layer(s) 132, 136, and/or 136. Better optical confinement allows for electrodes 120 to be spaced more closely to waveguide 130 without infringing upon the optical mode. Thus, for improved V-pi, a thicker waveguide, e.g., including layers 132, 134, and 136, may be desired for an optical modulator. Thus, electro-optic structure 130 (a waveguide defined by a rib of layer 136 on slab 132 with intervening layer 134) having a thicker waveguide may achieve lower V-pi*L in the modulator region for a given loss. For example, modulators with V-pi*L below 2.4 Vcm and metal-absorption loss below 0.1 dB/cm may be achieved using layers 132, 134 and 136 for a waveguide (e.g. having w3 not exceeding 100 micrometer) for a 1550 nm optical wavelength.

Thus, electro-optic structures, such as structures 130 and 130', within electro-optic device 100 may be better configured for their individual purposes. As a result, electro-optic device 100 may have better overall performance. Fewer tradeoffs between performance of the components of electro-optic device 100 may be made. Higher complexity devices (such as dual polarization coherent modulators) having the desired performance may be provided because each component may have an optimized configuration of the electro-optic material(s) in layers 132, 134, and 136. Moreover, because TFLC layers 132, 134, and 135 may be processed with smoother sidewalls, lower optical losses may be achieved for electro-optic device 100. Thus, performance of electro-optic device 100 may be improved.

Figure 2A:
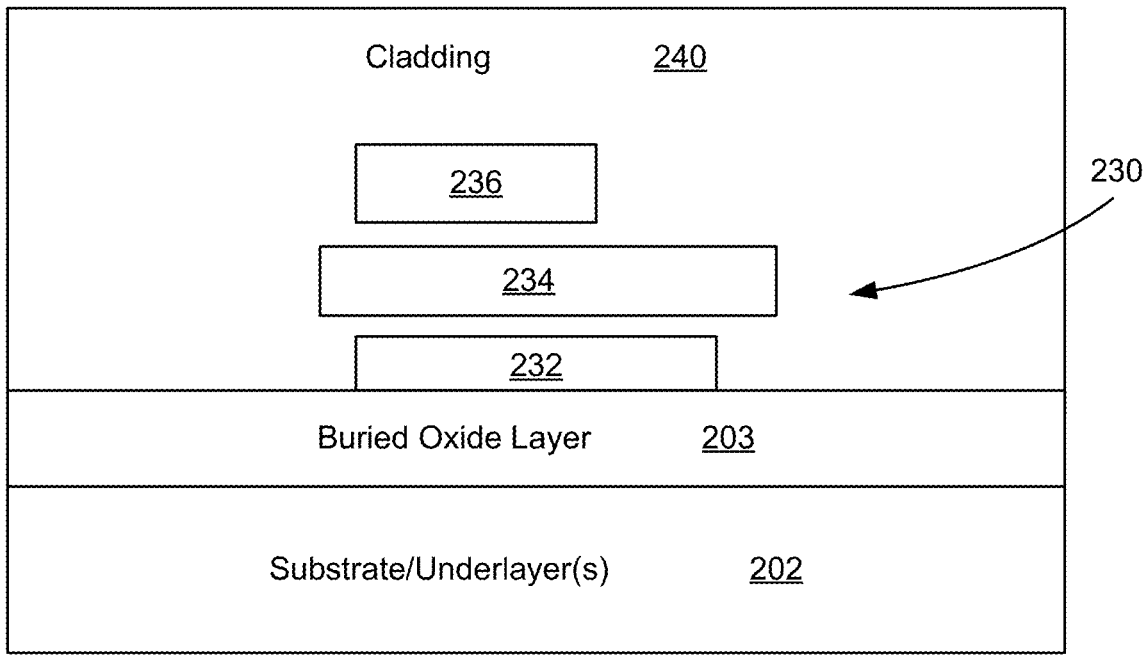
FIGS. 2A-2B depict embodiments of electro-optic devices that may have improved device performance.
Figure 2B:
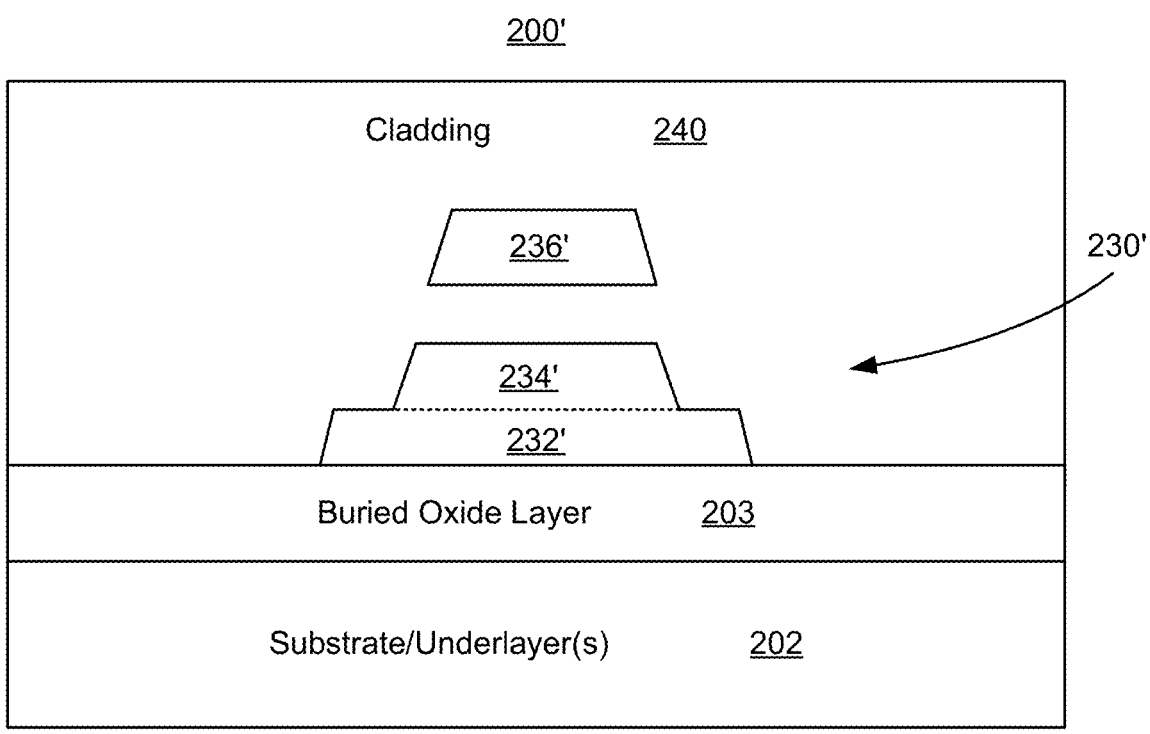

FIGS. 2A-2B depict embodiments of electro-optic devices 200 and 200' that may have improved device performance. FIGS. 2A and 2B are not to scale. FIG. 2A is a cross-sectional view of electro-optic device 200 at one region that includes electro-optic structure 230. FIG. 2B depicts a cross-sectional view of electro-optic device 200' that includes electro-optic structure 230'. Electro-optic devices 200 and 200' may include other and/or additional structures that are not shown for simplicity. Electro-optic devices 200 and 200' are analogous to electro-optic device 100. Thus, electro-optic devices 200 and 200' are on a substrate structure that includes substrate 202 and BOX layer 203 that are analogous to substrate 102 and BOX layer 103. Electro-optic device 200 includes layers 232, 234, and 236 that are analogous to layers 132, 134, and 136, respectively. Similarly, electro-optic device 200' includes layers 232', 234', and 236' that are analogous to layers 132, 134, and 136, respectively. Also shown is cladding 240, which is analogous to cladding 140.

Layers 232, 234, 236, 232', 234', and 236' may be TFLC electro-optic materials, such as TFLN and/or TFLT. The same or different electro-optic materials may be used for layers 232, 234, 236, 232', 234', and/or 236'. Further, in some embodiments, one of the layers shown may be or include a different waveguiding material, such as SiON and/or SiN. The thicknesses of layers 232, 234, 236, 232', 234', and 236 may be analogous to that of layers 132, 134, and 136. However, one or more of layers 232, 234, and 236 and layers 232', 234', and 236' are separated by dielectric layers (e.g. cladding 240). Layers 232, 234, and 236 of electro-optic structure 230 are interleaved with dielectric. Further, the width of layer 232 is shown as less than that of layer 234. In embodiments in which electro-optic layers are not separated by dielectric, the layers closer to the substrate are generally at least as wide as layers further from the substrate. In electro-optic structure 230', layers 232' and 234' share an interface. In some embodiments, layers 232' and 234' may be formed from a single electro-optic layer having a thickness of at least layers 232' and 234' combined. However, layer 236' is separated from layers 232' and 234' by dielectric. In other embodiments, layers 234' and 236' may share an interface and be separated from layer 232' by a dielectric. As used herein, layers that share an interface may be separately formed and include different material(s) or may include the same materials, be formed together, be formed from the same layer, or be part of the same layer. Although described as different devices, in some embodiments, the configurations shown in electro-optic devices 200 and 200' may be part of the same device. Similarly, in some embodiments, one or more layers 232, 232', 234, 234', 236, and/or 236' may be separated in some regions, but some or all may share an interface in other regions of the same device. For example, electro-optic devices 100, 200, and/or 200' may be different regions of the same photonics device.

Electro-optic devices 200 and 200' may share the benefits of electro-optic device 100. Electro-optic structures, such as structures 230 and 230', within electro-optic devices 200 and 200' may be better configured for their individual purposes. As a result, electro-optic devices 200 and 200' may have better overall performance. Higher complexity devices having the desired performance may be fabricated because each component may have an optimized configuration of the electro-optic material(s) in layers 232, 234, 236, 232', 234', and 236'. Moreover, because TFLC may be processed with smoother sidewalls, lower optical losses may be achieved for electro-optic devices 200 and 200'. Thus, performance of electro-optic devices 200 and/or 200' may be improved.

Figure 3:
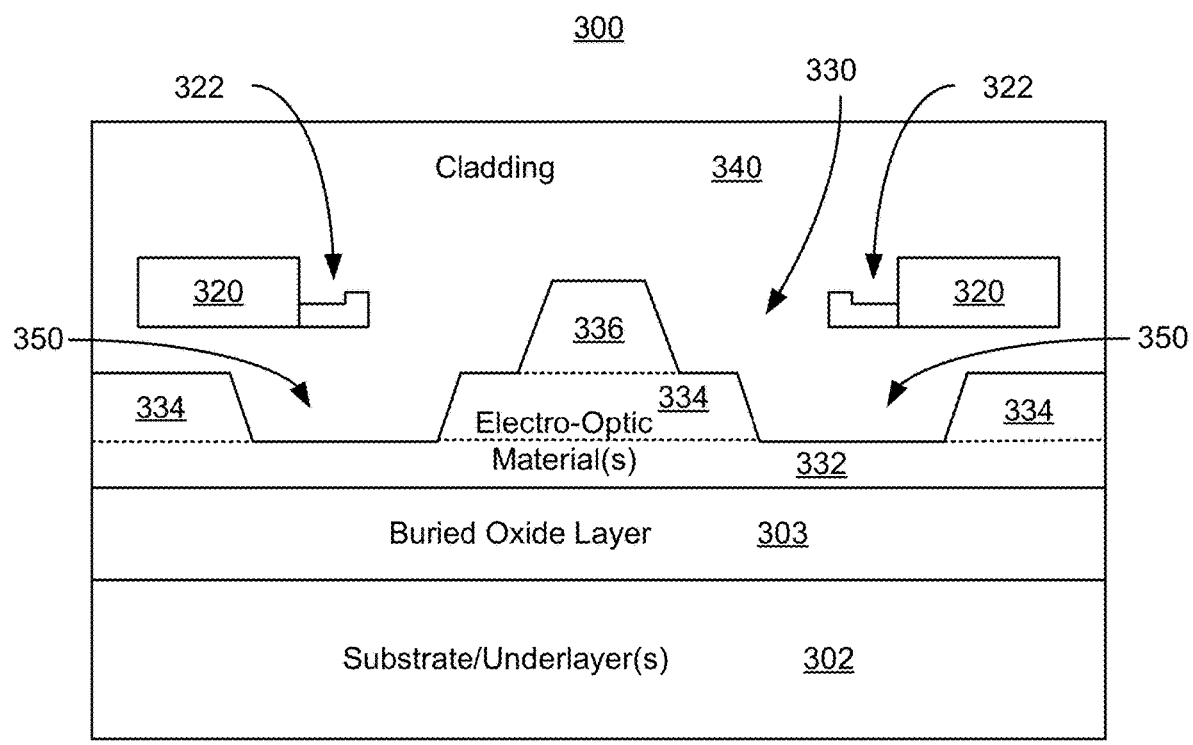
FIG. 3 depicts an embodiment of an electro-optic device that may have improved device performance.

FIG. 3 depicts an embodiment of an electro-optic device 300 that may have improved device performance. FIG. 3 is not to scale. FIG. 3 is a cross-sectional view of electro-optic device 300 at one region that includes electro-optic structure 330. Electro-optic device 300 may include other and/or additional structures that are not shown for simplicity. Electro-optic device 300 is analogous to electro-optic device(s) 100, 200, and/or 200'. Thus, electro-optic device 300 is on a substrate structure that includes substrate 302 and BOX layer 303 that are analogous to substrate 102 and BOX layer 103. Electro-optic device 300 includes layers 332, 334, and 336 that are analogous to layers 132, 134, and 136, respectively. Also shown is cladding 340, which is analogous to cladding 140. Also shown are electrodes 320 having extensions 322 that are analogous to electrodes 120 and extensions 122. In some embodiments, extensions 322 may be omitted or configured differently. Layers 332, 334, and 336 may be TFLC electro-optic materials, such as TFLN and/or TFLT. The same or different electro-optic materials may be used for layers 332, 334, and/or 336. The thicknesses of layers 332, 334, and/or 336 may be analogous to that of layers 132, 134, and 136.

Electro-optic structure 330 is a waveguide for an electro-optic modulator. Thus, electrodes 320 are shown. Layers 332, 334, and 336 may be configured to improve performance of electro-optic structure 330. For example, layer 336 may be configured to confine the optical mode. Thus, layer 336 may have a width of not more than 100 micrometers. In addition, layer 334 has been etched to form trenches 350 adjacent to the waveguiding portion of electro-optic structure 330 and exposing layer 332. In some embodiments, some of layer 332 may be etched through to form trenches 350. However, an aperture may not be formed in layer 332 (i.e. some of layer 332 remains in trenches 350). In some embodiments, layer 334 may not be completely etched through to when forming trenches 350. Remaining layer 334 in trenches 350 may better guide the electric field generated by electrodes 320 to the optical mode in layer 336 and part of layer 334 (i.e. the portion of layer 334 adjoining and below layer 336) (collectively rib 336/334). Because rib 336/334 is formed by layer 336 and the portion of layer 334 sharing an interface with and below layer 336, the widths of layers 336 and the portion of layer 334 sharing an interface with layer 336 may be similar. For example, the portion of layer 334 that is part of rib 336/334 may be less than one micrometer wider than layer 336. In some embodiments, the portion of layer 334 that is part of rib 336/334 may be less than five hundred nanometers wider than layer 336.

Trenches 350 allow for better optical mode confinement in rib 336/334. Consequently, electrodes 320 to be brought closer to the optical mode in rib 336/334. This may allow for an improved V-pi for a given optical propagation loss. Extra rib loading (i.e. a thicker waveguide formed by rib 336/334) allows strong confinement and helps prevent leakage of optical mode to the slab formed by layers 332 and a remaining portion of layer 334. Typical widths of trench 350 may be eight hundred nanometers through one thousand two hundred nanometers (e.g., nominally one micrometer). In some embodiments, this technique may be used to reduce the V-pi*L for a modulator by 10%-30% compared to designs without trench 350 (e.g. without layer 332).

Electro-optic device 300 may share the benefits of electro-optic device(s) 100, 200, and/or 200'. Electro-optic structures, such as structure 330, within electro-optic device 300 may be better configured for its purposes. For example, modulator 330 may have improved V-pi*L. As a result, electro-optic device 300 may have better overall performance. Higher complexity devices having the desired performance may be fabricated because each component may have an optimized configuration of the electro-optic material(s) in layers 332, 334, and 336. Moreover, because TFLC may be processed with smoother sidewalls, lower optical losses may be achieved for electro-optic device 300. Thus, performance of electro-optic device 300 may be improved.

Figure 4:
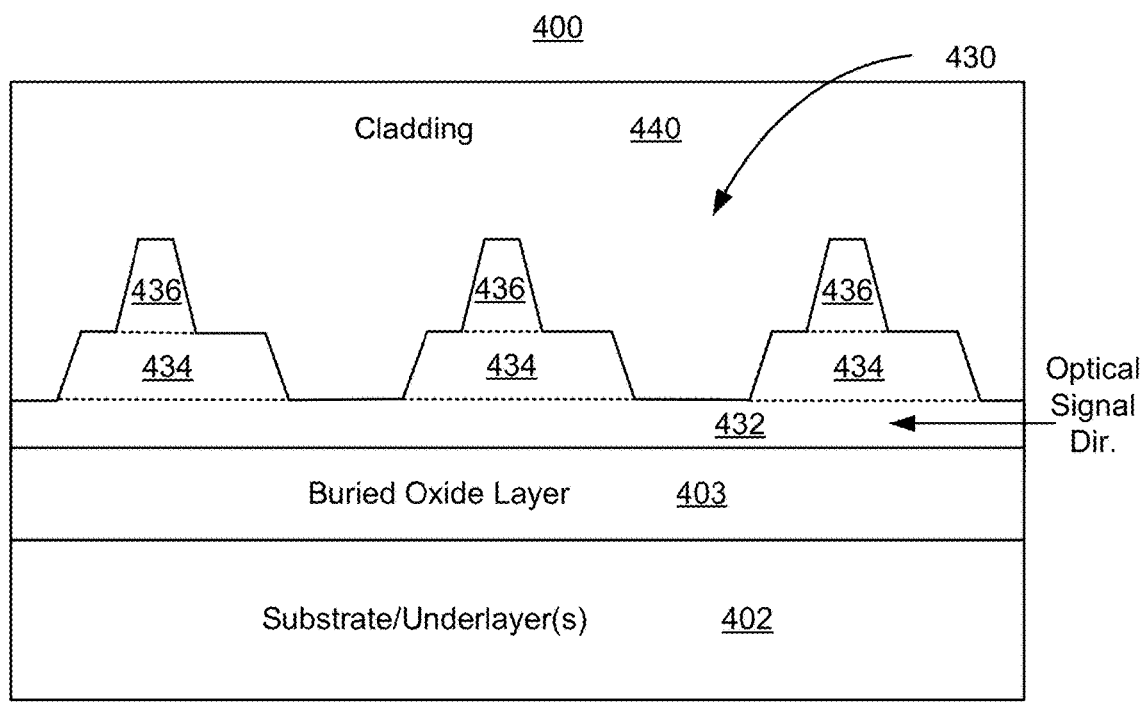
FIG. 4 depicts an embodiment of an electro-optic device that may have improved device performance.

FIG. 4 depicts an embodiment of electro-optic device 400 that may have improved device performance. FIG. 4 is not to scale. FIG. 4 is a cross-sectional view of electro-optic device 400 at one region that includes electro-optic structure 430. Electro-optic device 400 may include other and/or additional structures that are not shown for simplicity. Electro-optic device 400 is analogous to electro-optic device(s) 100, 200, 200', and/or 300. Thus, electro-optic device 400 is on a substrate structure that includes substrate 402 and BOX layer 403 that are analogous to substrate 102 and BOX layer 103. Electro-optic device 400 includes layers 432, 434, and 436 that are analogous to layers 132, 134, and 136, respectively. Also shown is cladding 440, which is analogous to cladding 140. Layers 432, 434, and 436 may be TFLC electro-optic materials, such as TFLN and/or TFLT. The same or different electro-optic materials may be used for layers 432, 434, and/or 436. The thicknesses of layers 432, 434, and/or 436 may be analogous to that of layers 132, 134, and 136.

Electro-optic structure 430 is a grating. For example, electro-optic structure 430 may be used to couple some or all of an optical signal into or out of the waveguide carrying the optical signal. The direction of the optical signal in layer 432 is indicated by the arrow in FIG. 4. Layers 432, 434, and 436 may be configured to improve performance of electro-optic structure 430. For example, grating 430 is a blazed grating. Thus, grating 430 is asymmetric. The asymmetry is achieved through the placement of portions layer 436 off center from portions of layers 434 sharing an interface. These structures are termed teeth 436/434 of grating 430. For example, teeth 436/434 may be formed by first etching layer 436 using a first mask, and then etching layer 434 using a different mask. Other techniques may be used. Thus, asymmetric, repeatable grating 430 may be formed. In some embodiments, each portion of layer 436 (i.e. the top portion of teeth 436/434) may be at least 0.1 micrometer and not more than 0.5 micrometers wide. Although not shown, back reflectors (e.g. a mirror between layer 432 and buried oxide layer 403) and apodization may be used to further reduce insertion loss. In some embodiments, the optical insertion loss may be less than 4 dB for grating 430.

Electro-optic device 400 may share the benefits of electro-optic device(s) 100, 200, 200', and/or 300. Electro-optic structures, such as structure 430, within electro-optic device 400 may be better configured for its purposes. For example, grating 430 may have improved insertion loss. As a result, electro-optic device 400 may have better overall performance. Higher complexity devices having the desired performance may be fabricated because each component may have an optimized configuration of the electro-optic material(s) in layers 432, 434, and 436. Moreover, because TFLC may be processed with smoother sidewalls, lower optical losses may be achieved for electro-optic device 400. Thus, performance of electro-optic device 400 may be improved.

Figure 5A:
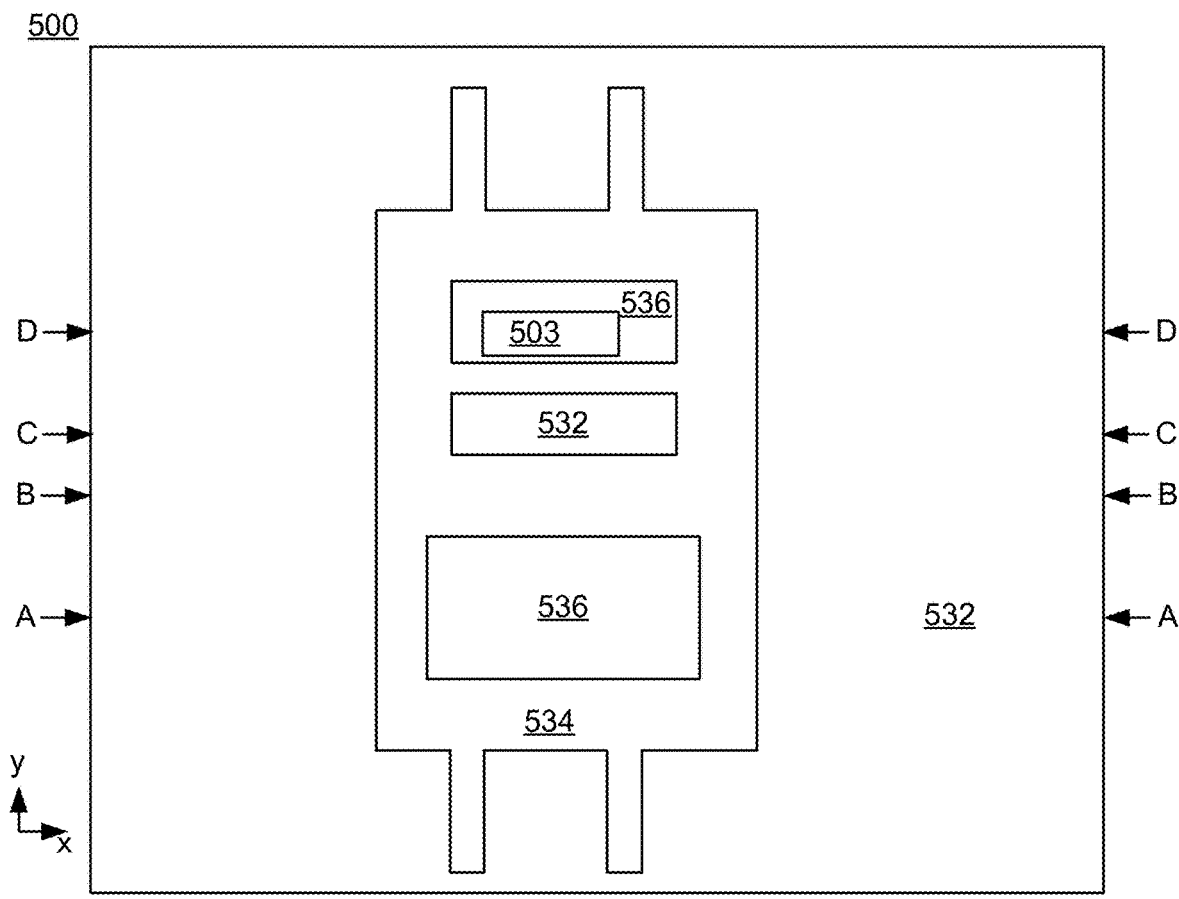
FIGS. 5A-5B depict an embodiment of an electro-optic device that may have improved device performance.
Figure 5B:
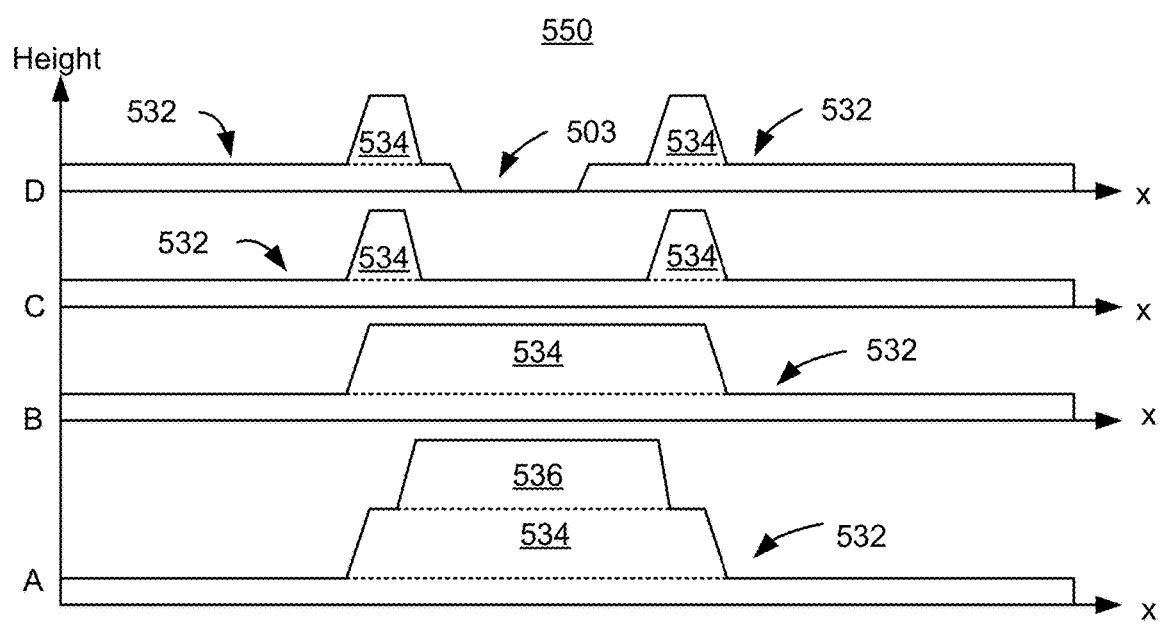

FIGS. 5A-5B depict an embodiment of electro-optic device 500 that may have improved device performance. FIG. 5A is a top view of electro-optic device 500. FIG. 5B is graph 550 indicating the thicknesses of the layers of electro-optic device 500 at positions between arrows A-A, B-B, C-C, and D-D. FIGS. 5A-5B are not to scale. Electro-optic device 500 includes electro-optic structure 530. Electro-optic device 500 may include other and/or additional structures that are not shown for simplicity. Electro-optic device 500 is analogous to electro-optic device(s) 100, 200, 200', 300, and/or 400. Thus, electro-optic device 500 is on a substrate structure that includes substrate 502 and BOX layer 503 that are analogous to substrate 102 and BOX layer 103. Electro-optic device 500 includes layers 532, 534, and 536 that are analogous to layers 132, 134, and 136, respectively. Also shown is cladding 540, which is analogous to cladding 140. Layers 532, 534, and 536 may be TFLC electro-optic materials, such as TFLN and/or TFLT. The same or different electro-optic materials may be used for layers 532, 534, and/or 536. The thicknesses of layers 532, 534, and/or 536 may be analogous to that of layers 132, 134, and 136.

Electro-optic structure 530 is a multilayer multi-mode interference (MMI) coupler. Other MMI devices may be fabricated in an analogous manner. Layers 532, 534, and 536 may be configured to improve performance of electro-optic structure 530. For example, various portions of MMI coupler 530 may include layers 532, 534, and 536, layers 532 and 534, layer 532, or no electro-optic layers (e.g. in aperture 503 which may expose the underlying BOX layer). Layers 532, 534, and 536 may be interleaved to provide more direct control over the propagation of different modes. For example, symmetry can be selectively broken to induce conversion between different modes. A wider design space is achieved through the use of layers 532, 534, and 536. This is particularly fruitful when using inverse design techniques, as for MMI coupler. This can allow the creation of more robust designs (e.g. MMI coupler 530) that are more tolerant to fabrication variation. Using these design techniques, couplers with imbalance below 1 dB, insertion loss below 0.5 dB, and phase error below 1.5 degrees across the C and L optical bands may be provided.

Electro-optic device 500 may share the benefits of electro-optic device(s) 100, 200, 200', 300, and/or 400. Electro-optic structures, such as structure 530, within electro-optic device 500 may be better configured for its purposes. For example, MMI device 530 may have improved performance and/or improved fabrication. As a result, electro-optic device 500 may have better overall performance. Higher complexity devices having the desired performance may be fabricated because each component may have an optimized configuration of the electro-optic material(s) in layers 532, 534, and 536. Moreover, because TFLC may be processed with smoother sidewalls, lower optical losses may be achieved for electro-optic device 500. Thus, performance of electro-optic device 500 may be improved.

Figure 6:
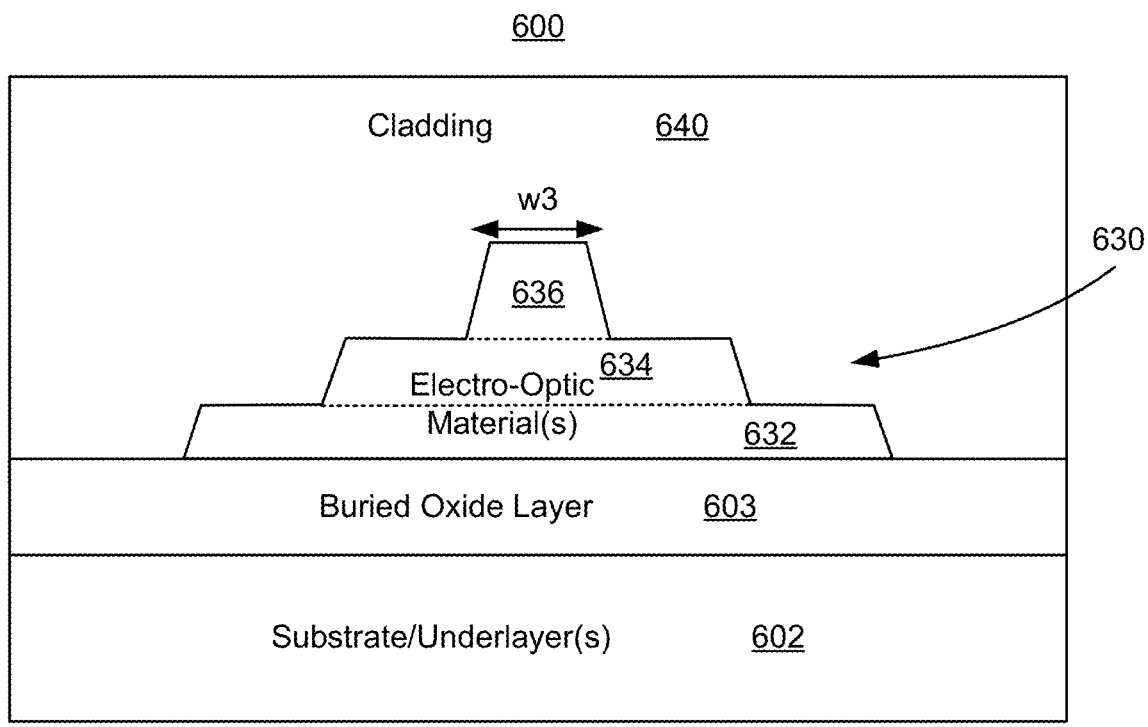
FIG. 6 depicts an embodiment of an electro-optic device that may have improved device performance.

FIG. 6 depicts an embodiment of electro-optic device 600 that may have improved device performance. FIG. 6 is a cross-sectional view of one region electro-optic device 600. FIG. 6 is not to scale. Electro-optic device 600 includes electro-optic structure 630. Electro-optic device 600 may include other and/or additional structures that are not shown for simplicity. Electro-optic device 600 is analogous to electro-optic device(s) 100, 200, 200', 300, 400, and/or 500. Thus, electro-optic device 600 is on a substrate structure that includes substrate 602 and BOX layer 603 that are analogous to substrate 102 and BOX layer 103. Electro-optic device 600 includes layers 632, 634, and 636 that are analogous to layers 132, 134, and 136, respectively. Also shown is cladding 640, which is analogous to cladding 140. Layers 632, 634, and 636 may be TFLC electro-optic materials, such as TFLN and/or TFLT. The same or different electro-optic materials may be used for layers 632, 634, and/or 636. The thicknesses of layers 632, 634, and/or 636 may be analogous to that of layers 132, 134, and 136.

Electro-optic structure 630 is a polarization rotator. In some embodiments, electro-optic structure 630 may be an adiabatic (e.g., low loss) polarization rotator. However, electro-optic structure 630 need not be adiabatic. Layers 632, 634, and 636 may be configured to improve performance of electro-optic structure 630. A thicker layer waveguide, e.g. using layer 636, may provide a stronger coupling between TE1 and TM0 optical modes. This allows for a more robust mode converter (which may be adiabatic) between these two modes. Because of the stronger coupling between the polarization modes, polarization rotator 630 may be more tolerant to fabrication errors. In addition, the stronger coupling allows polarization rotator 630 to consume less area of the photonic integrated circuit because the taper (out of the plane of the page in FIG. 6) may be shorter.

Electro-optic device 600 may share the benefits of electro-optic device(s) 100, 200, 200', 300, 400, and/or 500. Electro-optic structures, such as structure 630, within electro-optic device 600 may be better configured for its purposes. For example, polarization rotator 630 may have stronger coupling between, e.g., TE1 and TM0 modes. As a result, electro-optic device 600 may have better overall performance. Higher complexity devices having the desired performance may be fabricated because each component may have an optimized configuration of the electro-optic material(s) in layers 632, 634, and 636. Moreover, because TFLC may be processed with smoother sidewalls, lower optical losses may be achieved for electro-optic device 600. Thus, performance of electro-optic device 600 may be improved.

Figure 7:
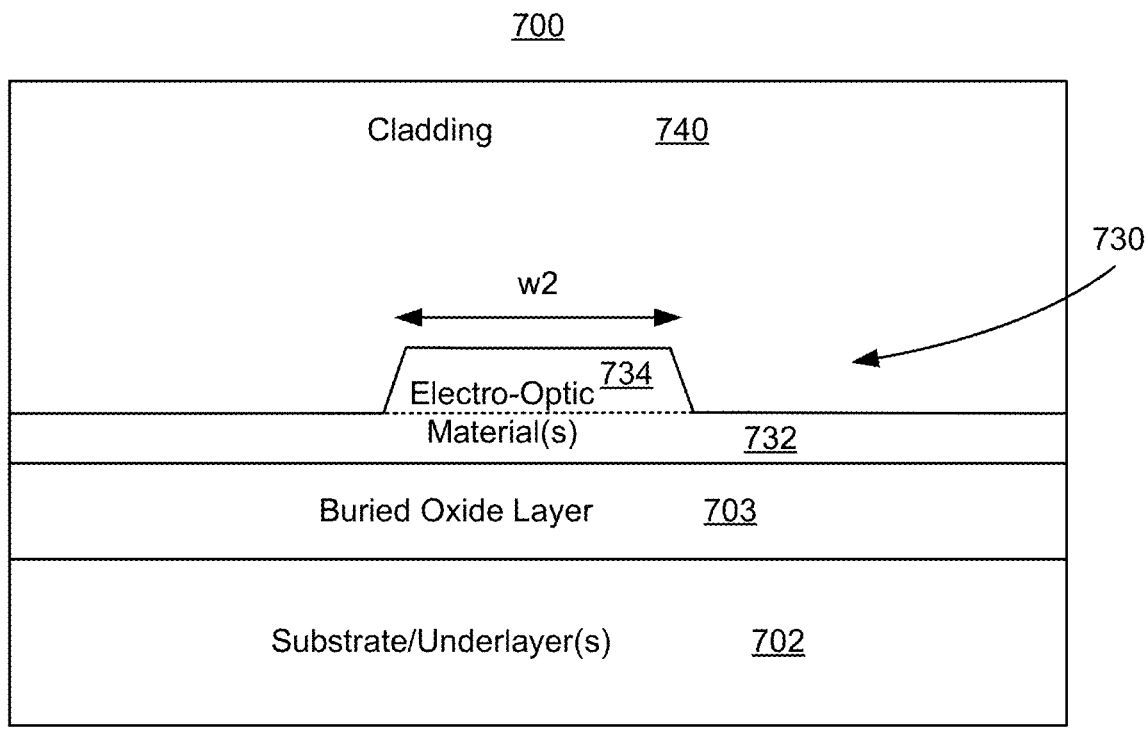
FIG. 7 depicts an embodiment of an electro-optic device that may have improved device performance.

FIG. 7 depicts a cross-sectional view of a portion of an embodiment of an electro-optic device 700 that may have improved device performance. FIG. 7 is not to scale. Electro-optic device 700 includes electro-optic structure 730. Electro-optic device 700 may include other and/or additional structures that are not shown for simplicity. Electro-optic device 700 is analogous to electro-optic device(s) 100, 200, 200', 300, 400, 500, and/or 600. Thus, electro-optic device 700 is on a substrate structure that includes substrate 702 and BOX layer 703 that are analogous to substrate 102 and BOX layer 103. Electro-optic device 700 includes layers 732 and 734 that are analogous to layers 132 and 134, respectively. Also shown is cladding 740, which is analogous to cladding 140. Layers 732 and 734 may be TFLC electro-optic materials, such as TFLN and/or TFLT. The same or different electro-optic materials may be used for layers 732 and/or 734. The thicknesses of layers 732 and/or 734 may be analogous to that of layers 132 and 134. Although not shown in FIG. 7, electro-optic device 700 includes an additional layer analogous to layer 136. Thus, in other regions of device 700, a thicker rib and/or other structure may be formed. Further, although described in the context of layers 732 and 734 (analogous to layers 132 and 134), electro-optic structure may be formed from a layer analogous to layer 136 and layer 734 or a layer analogous to layer 136 and a combination of layers 732 and 734.

Electro-optic structure 730 is also a polarization rotator. Layers 732 and 734 may be configured to improve performance of electro-optic structure 730. In particular, layers 732 and 734 have a strong mode crossing between TE and TM optical modes in the mode structure. For example, the waveguide of electro-optic structure 730 is formed by a rib of layer 734 on slab layer 732. Although shown as not including a slab portion (i.e. parts of layer 734 have been completely removed to form the rib), layer 734 might not be etched through. Thus, a thicker slab region formed of layer 732 and a thinned portion of layer 734 may be used in electro-optic structure 730. Layers 732 and 734 may provide a mode crossing near an easily fabricated rib width, w2, of 1.2 micrometers to 1.8 micrometers (e.g. nominally 1.5 micrometers). Further, such a mode crossing may have an anti-crossing interaction strength of more than 0.01 effective index units.

Electro-optic device 700 may share the benefits of electro-optic device(s) 100, 200, 200', 300, 400, 500, and/or 600. Electro-optic structures, such as structure 730, within electro-optic device 700 may be better configured for its purposes. For example, polarization rotator 730 may have stronger mode crossing. As a result, electro-optic device 700 may have better overall performance. Higher complexity devices having the desired performance may be fabricated because each component may have an optimized configuration of the electro-optic material(s) in layers 732, 734, and 736. Moreover, because TFLC may be processed with smoother sidewalls, lower optical losses may be achieved for electro-optic device 700. Thus, performance of electro-optic device 700 may be improved.

Figure 8A:
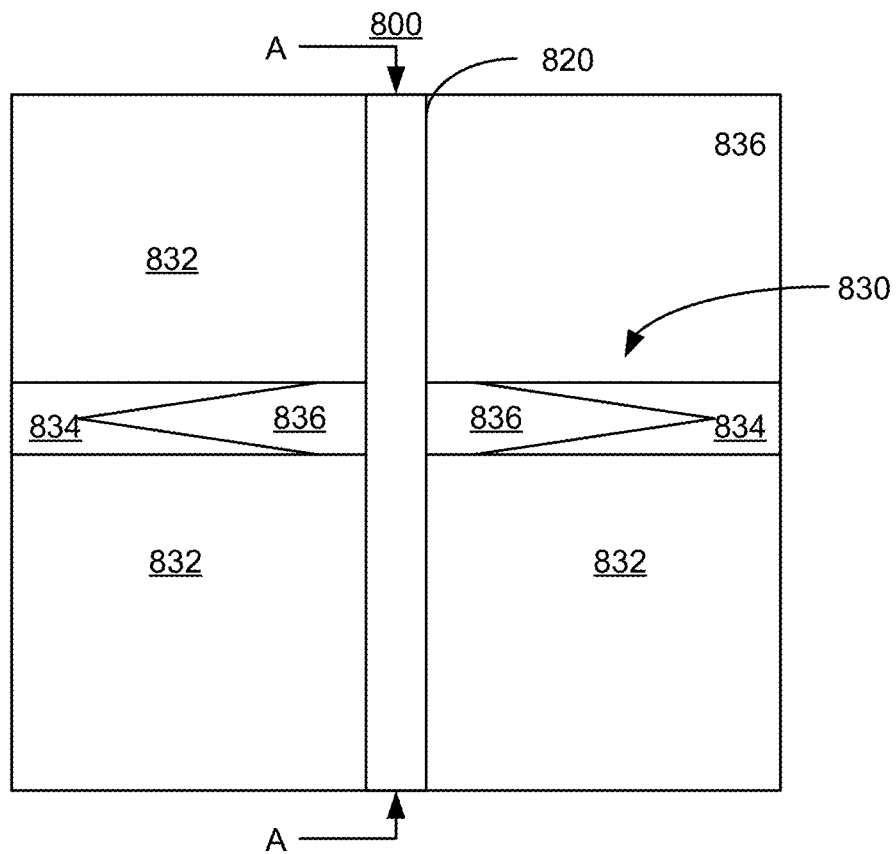
FIGS. 8A-8B depict an embodiment of an electro-optic device that may have improved device performance.
Figure 8B:
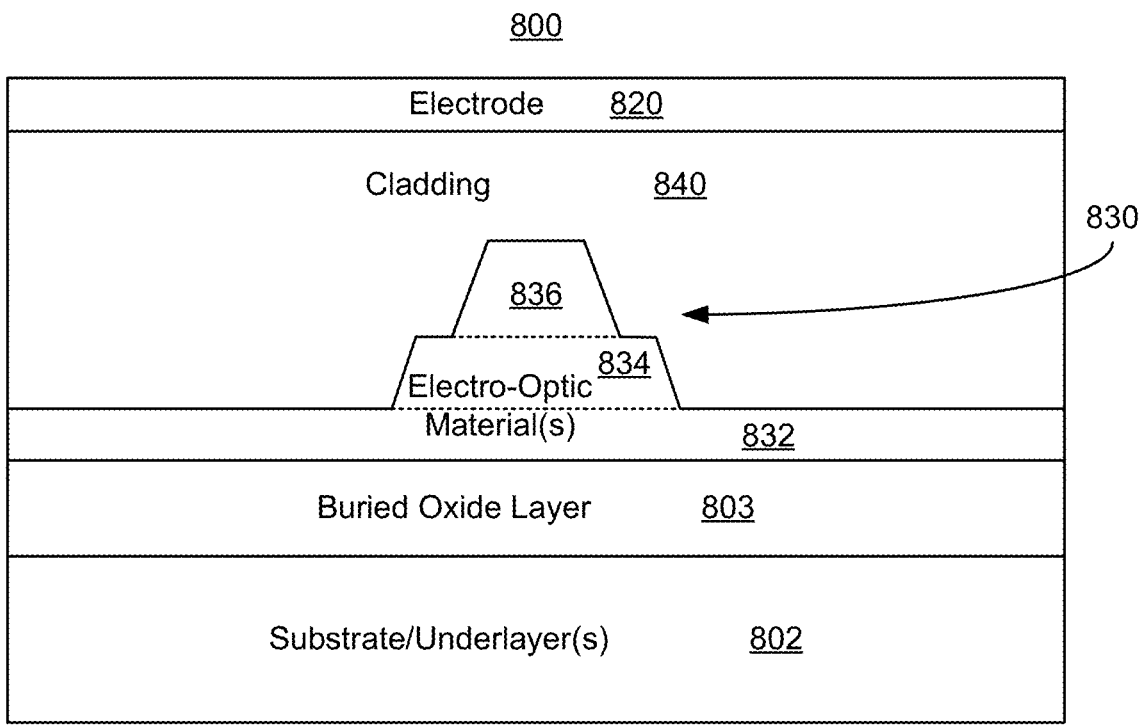

FIGS. 8A-8B depict an embodiment of an electro-optic device 800 that may have improved device performance. FIG. 8A is a plan view of electro-optic device 800. FIG. 8B is a cross-sectional view of one region electro-optic device 800 along a line between arrows A-A. FIGS. 8A and 8B are not to scale. Electro-optic device 800 includes electro-optic structure 830. Also shown is electrode 820. Electro-optic device 800 may include other and/or additional structures that are not shown for simplicity. Electro-optic device 800 is analogous to electro-optic device(s) 100, 200, 200', 300, 400, 500, 600, and/or 700. Thus, electro-optic device 800 is on a substrate structure that includes substrate 802 and BOX layer 803 that are analogous to substrate 102 and BOX layer 103. Electro-optic device 800 includes layers 832, 834, and 836 that are analogous to layers 132, 134, and 136, respectively. Also shown is cladding 840, which is analogous to cladding 140. Layers 832, 834, and 836 may be TFLC electro-optic materials, such as TFLN and/or TFLT. The same or different electro-optic materials may be used for layers 832, 834, and/or 836. The thicknesses of layers 832, 834, and/or 836 may be analogous to that of layers 132, 134, and 136.

Electro-optic structure 830 includes a waveguide proximate to a crossing with metal electrode 820. Layer 832 extends across the portion of electro-optic device 800 shown. In other embodiments, layer 832 may terminate closer to layers 834 and 836. Layers 834 and 836 may be considered to form a rib waveguide 836/834. In particular, layer 836 tapers on either side of electrode 820. Although a linear taper having a particular slope is shown, another taper in accordance with a different (i.e., nonlinear) function and/or having a different slope may be used. Thus, electro-optic structure 830 transitions to a thicker rib waveguide 836/834 including both layers 834 and 836. Rib waveguide 836/834 is a low loss waveguide that confines the optical mode. Consequently, optical loss due to metal absorption may be reduced. For example, the optical loss at a metal crossing point (e.g., shown in FIG. 8B) may be reduced to 0.1 dB/cm or less.

Electro-optic device 800 may share the benefits of electro-optic device(s) 100, 200, 200', 300, 400, 500, 600, and/or 700. Electro-optic structures, such as structure 830, within electro-optic device 800 may be better configured for its purposes. For example, a low loss waveguide 836/834 may be used in proximity to metal crossings. As a result, electro-optic device 800 may have reduced optical losses and better overall performance. Higher complexity devices having the desired performance may be fabricated because each component may have an optimized configuration of the electro-optic material(s) in layers 832, 834, and 836. Moreover, because TFLC may be processed with smoother sidewalls, lower optical losses may be achieved for electro-optic device 800. Thus, performance of electro-optic device 800 may be improved.

Figure 9A:
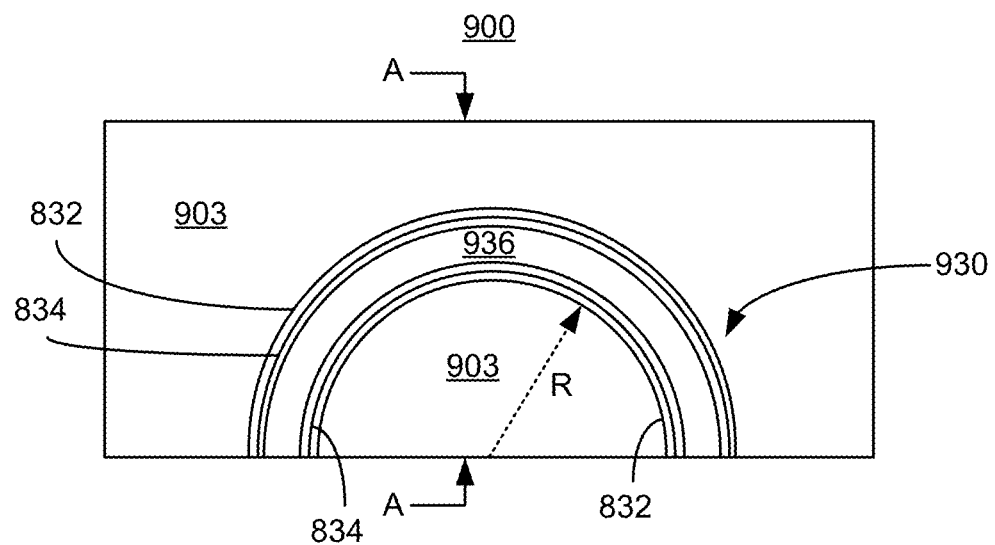
FIGS. 9A-9B depict an embodiment of an electro-optic device that may have improved device performance.
Figure 9B:
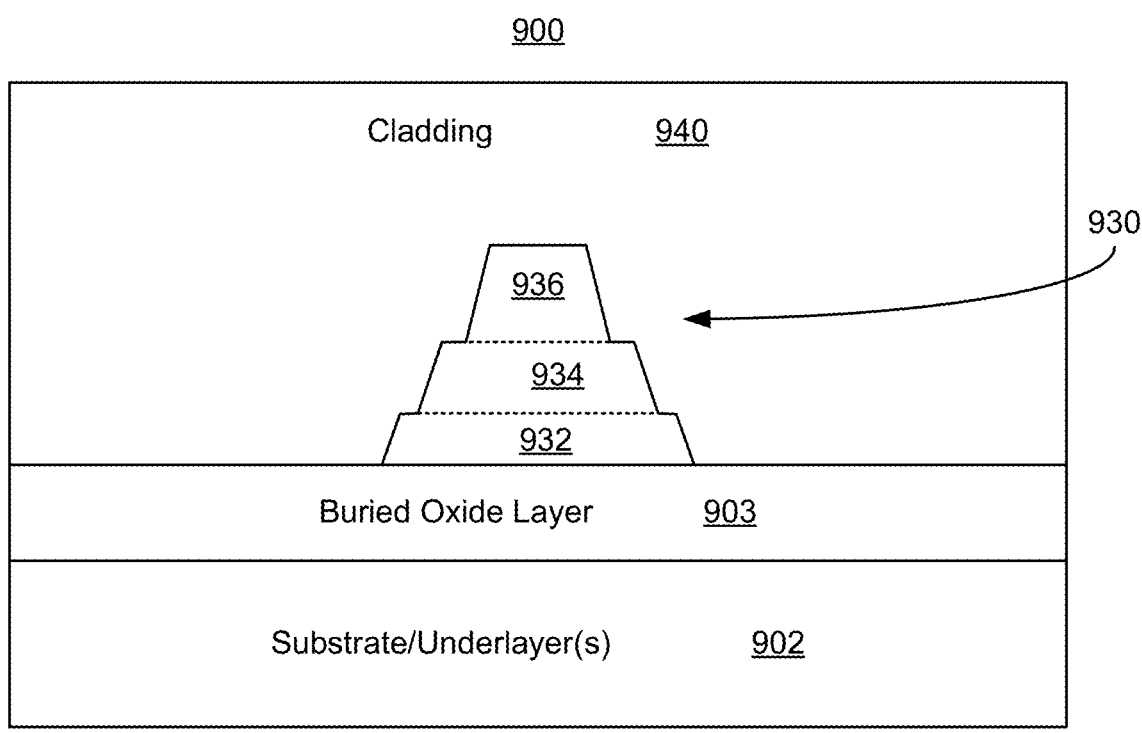

FIGS. 9A-9B depict an embodiment of electro-optic device 900 that may have improved device performance. FIG. 9A is a plan view of electro-optic device 900. FIG. 9B is a cross-sectional view of one region electro-optic device 900 along a line between arrows A-A. FIGS. 9A-9B are not to scale. Electro-optic device 900 includes electro-optic structure 930. Electro-optic device 900 may include other and/or additional structures that are not shown for simplicity. Electro-optic device 900 is analogous to electro-optic device(s) 100, 200, 200', 300, 400, 500, 600, 700, and/or 800. Thus, electro-optic device 900 is on a substrate structure that includes substrate 902 and BOX layer 903 that are analogous to substrate 102 and BOX layer 103. Electro-optic device 900 includes layers 932, 934, and 936 that are analogous to layers 132, 134, and 136, respectively. Also shown is cladding 940, which is analogous to cladding 140. Layers 932, 934, and 936 may be TFLC electro-optic materials, such as TFLN and/or TFLT. The same or different electro-optic materials may be used for layers 932, 934, and/or 936. The thicknesses of layers 932, 934, and/or 936 may be analogous to that of layers 132, 134, and 136.

Electro-optic structure 930 is a waveguide including a bend having a radius of curvature, R. In the region of the bend, layers 936, 934, and 932 have been etched to form a thick waveguide (rib 936/934/932). In particular, the portion of layer 932 distal from layer 936 has been removed. Stated differently, the thin, slab portion of electro-optic device 900 has been removed in the region of the bend in rib waveguide 936/934/932. For example, the total width of layer 932 may be not more than one micrometer greater than the width of layer 936. In some embodiments, the width of layer 932 may be not more than five hundred nanometers greater than the width of layer 936. Other widths are possible. In other regions, for example, near electrodes (not shown) for an electro-optic modulator, portions of layer 932 may remain. The slab portion in such regions may be used to guide the electric field generated by electrodes toward the optical mode. Because rib waveguide 936/934/932 does not have a slab portion, the optical mode is more strongly confined to rib 936/934/932. Consequently, tighter bending may be achieved for electro-optic structure 930. For example, optical bending radii at or below forty micrometers may be achieved with a reduced foot print and low optical loss. In some embodiments, layers 932 and 934 may remain unetched (i.e. a slab including layers 932 and 934 may be present). In such embodiments, the thicker (e.g. up to five hundred or up to six hundred nanometers) layer 936 may provide sufficient confinement of the optical mode for the desired bend radius.

Electro-optic device 900 may share the benefits of electro-optic device(s) 100, 200, 200', 300, 400, 500, 600, 700, and/or 800. Electro-optic structures, such as structure 930, within electro-optic device 900 may be better configured for its purposes. For example, a smaller bend radius at low optical losses may be provided. Thus, a low loss waveguide that consumes less area may be fabricated. As a result, electro-optic device 900 may have better overall performance. Higher complexity devices having the desired performance may be fabricated because each component may have an optimized configuration of the electro-optic material(s) in layers 932, 934, and 936. Moreover, because TFLC may be processed with smoother sidewalls, lower optical losses may be achieved for electro-optic device 900. Thus, performance of electro-optic device 900 may be improved.

Figure 10A:
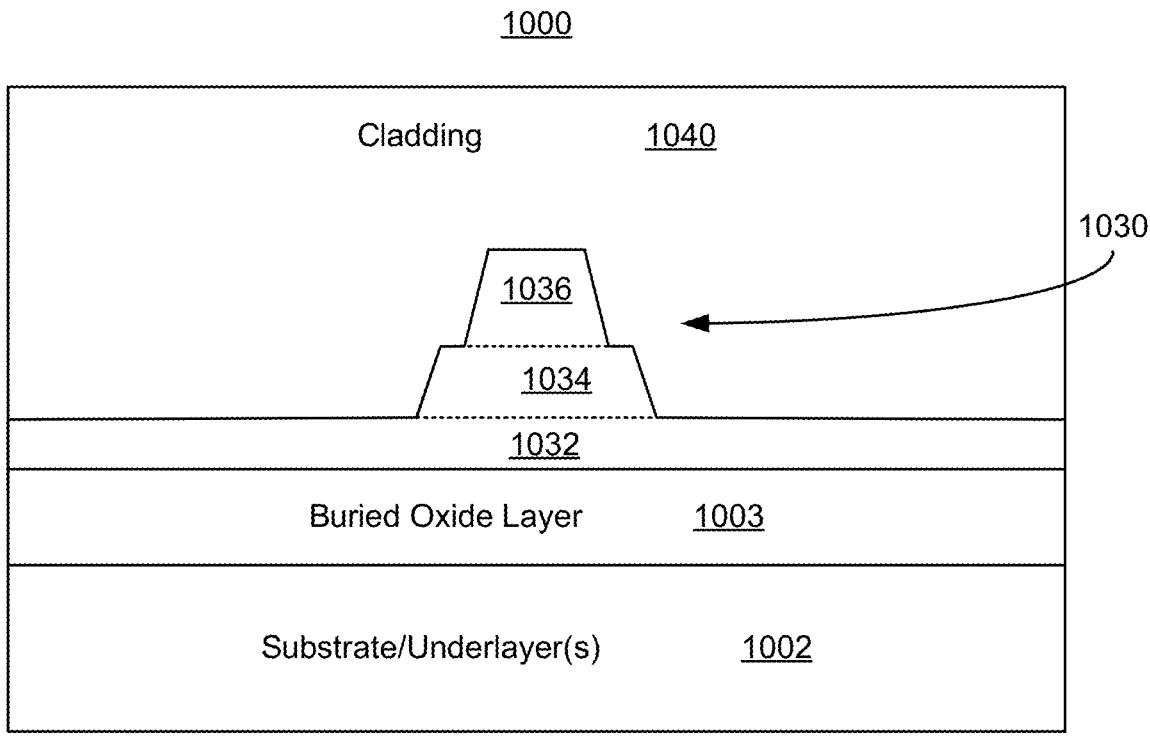
FIGS. 10A-10B depict an embodiment of an electro-optic device that may have improved device performance.
Figure 10B:
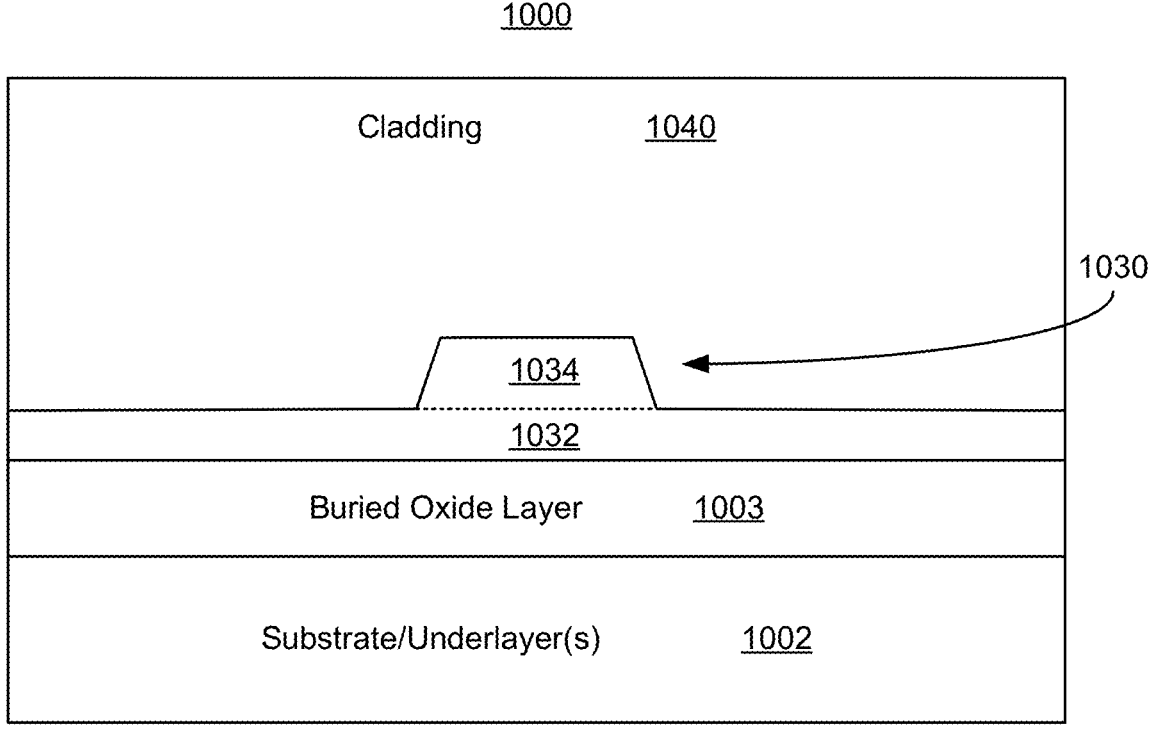

FIGS. 10A-10B depict an embodiment of an electro-optic device 1000 that may have improved device performance. FIG. 10A is a cross-sectional view of electro-optic device 1000 at one region. FIG. 10B is a cross-sectional view of another region electro-optic device 1000. FIGS. 10A and 10B are not to scale. Electro-optic device 1000 includes electro-optic structure 1030. Electro-optic device 1000 may include other and/or additional structures that are not shown for simplicity. Electro-optic device 1000 is analogous to electro-optic device(s) 100, 200, 200', 300, 400, 500, 600, 800, and/or 900. Thus, electro-optic device 1000 is on a substrate structure that includes substrate 1002 and BOX layer 1003 that are analogous to substrate 102 and BOX layer 103. Electro-optic device 1000 includes layers 1032, 1034, and 1036 that are analogous to layers 132, 134, and 136, respectively. Also shown is cladding 1040, which is analogous to cladding 140. Layers 1032, 1034, and 1036 may be TFLC electro-optic materials, such as TFLN and/or TFLT. The same or different electro-optic materials may be used for layers 1032, 1034, and/or 1036. The thicknesses of layers 1032, 1034, and/or 1036 may be analogous to that of layers 132, 134, and 136.

Electro-optic structure 1030 is a waveguide shown at two regions. FIG. 10A depicts a region including a rib formed of layers 1034 and 1036 (rib waveguide 1036/1034) and slab portion including layer 1032. FIG. 10B depicts a region in which layer 1036 has been removed. Thus, the waveguide 1030 includes a rib formed of layer 1034 (rib waveguide 1034) and a slab portion including layer 1032 in this area. Lithium niobate, as well as other electro-optic materials, is birefringent. The optical index of LN is anisotropic. Consequently, the effective index of optical modes can depend on the propagation angle φ of the waveguide with respect to an axis. In some TFLN waveguides, the resulting mode structure has an undesirable mode coupling in the bend. By using multiple layers, electro-optic structure 930 has a waveguide geometry that does not have such mode crossings. For example, rib waveguide 1036/1034 transitions to rib waveguide 1034 in proximity to and throughout some bends. Thus, electro-optic structure may avoid unwanted bend-induced mode crossings.

Electro-optic device 1000 may share the benefits of electro-optic device(s) 100, 200, 200', 300, 400, 500, 600, 700, 800, and/or 900. Electro-optic structures, such as structure 1030, within electro-optic device 1000 may be better configured for its purposes. For example, undesirable bend induced TE0 to TM0 (and/or other) mode conversion may be avoided. As a result, electro-optic device 1000 may have better overall performance. Higher complexity devices having the desired performance may be fabricated because each component may have an optimized configuration of the electro-optic material(s) in layers 1032, 1034, and 1036. Moreover, because TFLC may be processed with smoother sidewalls, lower optical losses may be achieved for electro-optic device 1000. Thus, performance of electro-optic device 1000 may be improved.

Figure 11:
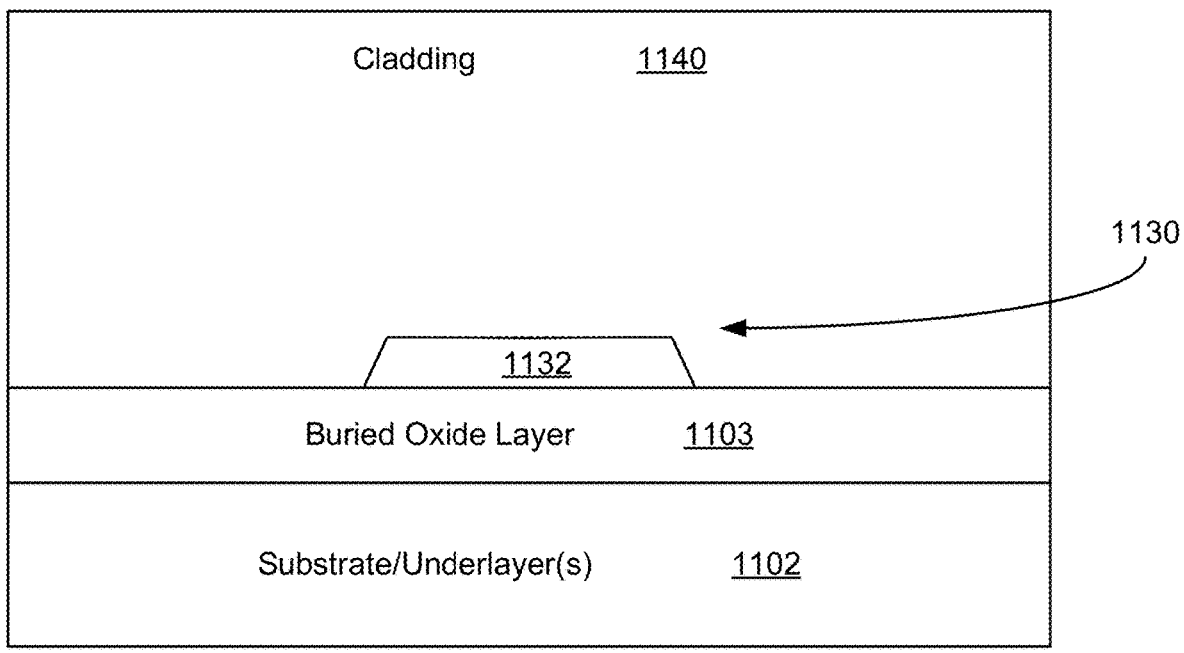
FIG. 11 depicts an embodiment of an electro-optic device that may have improved device performance.

FIG. 11 depicts an embodiment of an electro-optic device 1100 that may have improved device performance.

FIG. 11 depicts an embodiment of electro-optic device 1100 that may have improved device performance. FIG. 11 is a cross-sectional view of one region electro-optic device 1100. FIG. 11 is not to scale. Electro-optic device 1100 includes electro-optic structure 1130. Electro-optic device 1100 may include other and/or additional structures that are not shown for simplicity. Electro-optic device 1100 is analogous to electro-optic device(s) 100, 200, 200', 300, 400, 500, 600, 800, 900, and/or 1000. Thus, electro-optic device 1100 is on a substrate structure that includes substrate 1102 and BOX layer 1103 that are analogous to substrate 102 and BOX layer 103. Electro-optic device 1100 includes layer 1132 that is analogous to layer 132. Also shown is cladding 1140, which is analogous to cladding 140. Layer 1132 may be a TFLC electro-optic materials, such as TFLN and/or TFLT. The same or different electro-optic material(s) may be used for layer 1132. The thicknesses of layer 1132 may be analogous to that of layer 132. Although not shown, other portions of electro-optic device 1100 may include layers that are analogous to layers 134 and 136.

Electro-optic structure 1130 is a fiber-to-chip coupler. In addition to removing layers analogous to layers 134 and 136, layer 1132 has been etched to extend across only a portion of electro-optic device 1100. A thin layer 1132 allows fabrication of optical waveguide that hosts a mode well-matched to typical optical fiber modes. Given a particular minimum fabricable slab width (for example, one hundred nanometers), a thinner slab layer 1132 (e.g. having a thickness of two hundred and fifty nanometers or less) may achieve low loss coupling at the facet of electro-optic device 1100. For example, the optical losses may be below 2 dB per facet for coupling to a standard SMF-28 optical fiber at a wavelength of 1550 nm.

Electro-optic device 1100 may share the benefits of electro-optic device(s) 100, 200, 200', 300, 400, 500, 600, 700, 800, 900, and/or 1000. Electro-optic structures, such as structure 1130, within electro-optic device 1100 may be better configured for its purposes. For example, fiber-to-chip optical coupling may be achieved at lower losses. As a result, electro-optic device 1100 may have better overall performance. Higher complexity devices having the desired performance may be fabricated because each component may have an optimized configuration of the electro-optic material(s) in layers 1132, 1134, and 1136. Moreover, because TFLC may be processed with smoother sidewalls, lower optical losses may be achieved for electro-optic device 1100. Thus, performance of electro-optic device 1100 may be improved.

Figure 12:
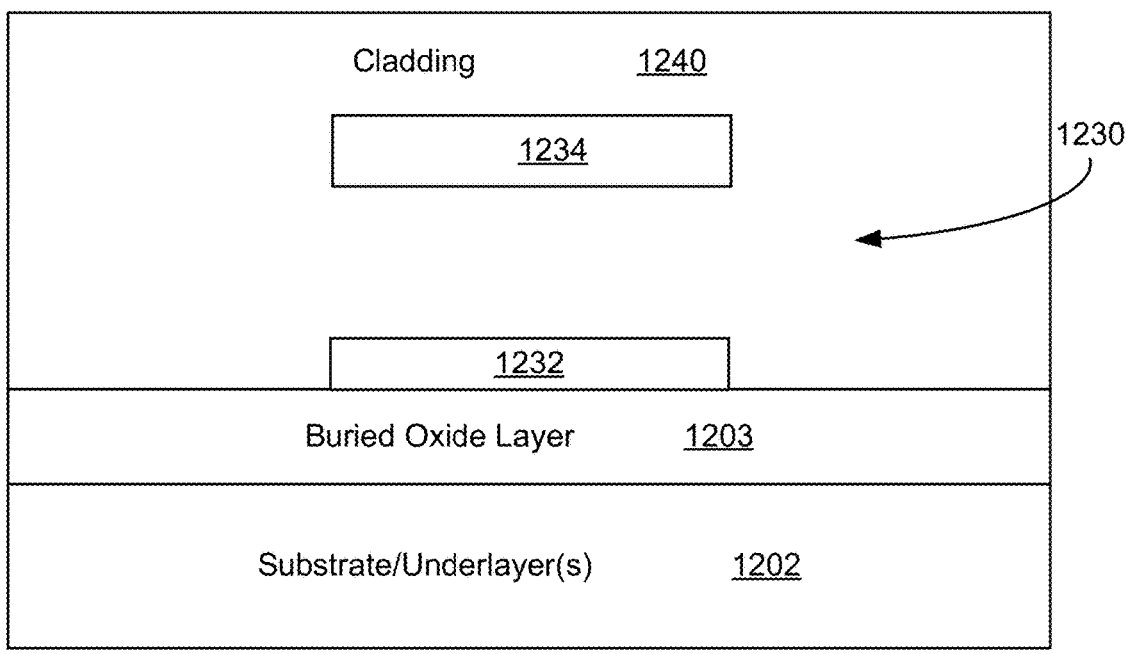
FIG. 12 depicts an embodiment of an electro-optic device that may have improved device performance.

FIG. 12 depicts an embodiment of electro-optic device 1200 that may have improved device performance. FIG. 12 is a cross-sectional view of one region electro-optic device 1200. FIG. 12 is not to scale. Electro-optic device 1200 includes electro-optic structure 1230. Electro-optic device 1200 may include other and/or additional structures that are not shown for simplicity. Electro-optic device 1200 is analogous to electro-optic device(s) 100, 200, 200', 300, 400, 500, 600, 800, 900, 1000, and/or 1100. Thus, electro-optic device 1200 is on a substrate structure that includes substrate 1202 and BOX layer 1203 that are analogous to substrate 102 and BOX layer 103. Electro-optic device 1200 includes layers 1232 and 1234 that are analogous to layers 132 and 134, layers 232 and 234, and/or layers 232' and 234'. Also shown is cladding 1240, which is analogous to cladding 140. Layers 1232 and 1234 may be TFLC electro-optic materials, such as TFLN and/or TFLT. The same or different electro-optic materials may be used for layers 1232 and/or 1234. The thicknesses of layers 1232 and/or 1234 may be analogous to that of layers 132 and 134. Although not shown, at another region, electro-optic device 1200 includes another layer analogous to layer(s) 136, 236, and/or 236'. Thus, such a layer may or may not be contiguous with layer 1234. However, such a layer has been removed in the region shown in FIG. 12.

Electro-optic structure 1230 is a multi-layer fiber coupler. Electro-optic structure 1230 uses multiple layers 1232 and 1234 separated by cladding material. Consequently, the optical mode shape can be tailored. For example, the optical mode may have improved overlap with optical fiber modes. In addition to the electro-optic layers described herein, one or more of layers 1232 and 1234 may include or consist of other materials other material(s) having a higher index of refraction than cladding 1240. For example, layers 1232 and/or 1234 may include or consist of SiN and/or Si. This technique may reduce the mode overlap loss between TFLN waveguides and optical fiber modes to below 1 dB/facet.

Electro-optic device 1200 may share the benefits of electro-optic device(s) 100, 200, 200', 300, 400, 500, 600, 700, 800, 900, 1000, and/or 1100. Electro-optic structures, such as structure 1230, within electro-optic device 1200 may be better configured for its purposes. For example, multi-layer fiber coupler 1230 may have reduced losses when coupling to and/or from optical fibers. As a result, electro-optic device 1200 may have better overall performance. Higher complexity devices having the desired performance may be fabricated because each component may have an optimized configuration of the electro-optic material(s) in layers 1232, 1234, and 1236. Moreover, because TFLC may be processed with smoother sidewalls, lower optical losses may be achieved for electro-optic device 1200. Thus, performance of electro-optic device 1200 may be improved.

Figure 13A:
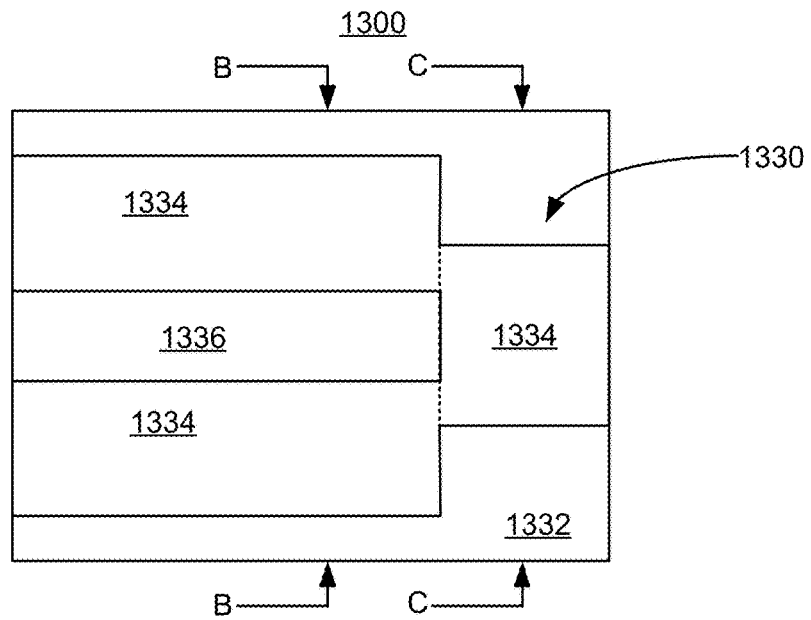
FIGS. 13A-13C depict an embodiment of an electro-optic device that may have improved device performance.
Figure 13B:
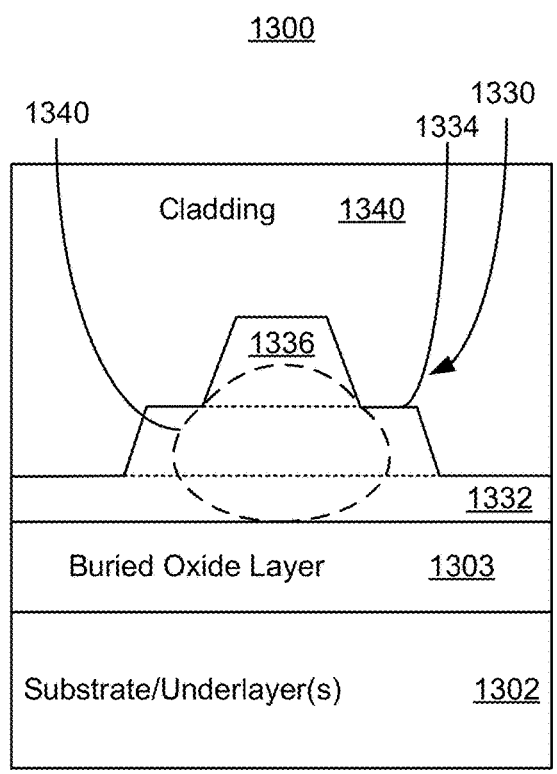
Figure 13C:
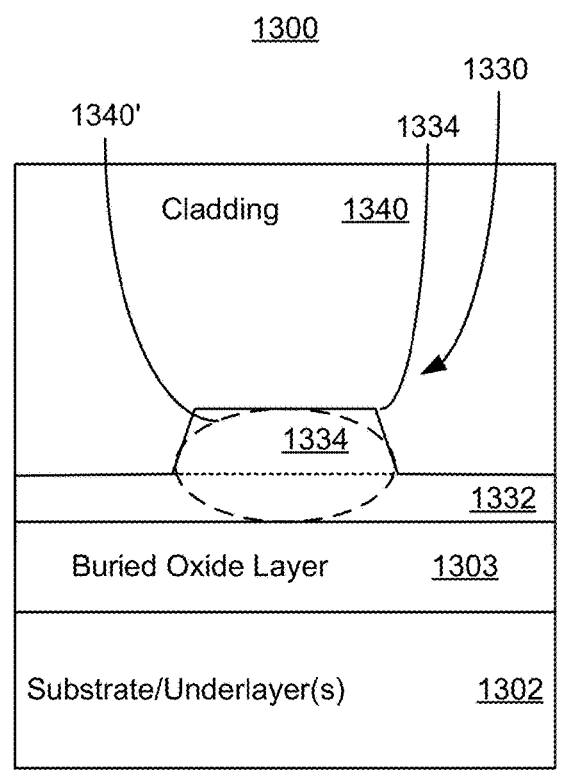

FIGS. 13A-13C depict an embodiment of an electro-optic device 1300 that may have improved device performance. FIG. 13A is a plan view of a portion of electro-optic device 1300. FIG. 13B a cross-sectional view of one region electro-optic device 1300 along a line between arrows A-A. FIG. 13C a cross-sectional view of one region electro-optic device 1300 along a line between arrows C-C. FIGS. 13A-13C are not to scale. Electro-optic device 1300 includes electro-optic structure 1330. Electro-optic device 1300 may include other and/or additional structures that are not shown for simplicity. Electro-optic device 1300 is analogous to electro-optic device(s) 100, 200, 200', 300, 400, 500, 600, 800, 900, 1000, 1100, and/or 1200. Thus, electro-optic device 1300 is on a substrate structure that includes substrate 1302 and BOX layer 1303 that are analogous to substrate 102 and BOX layer 103. Electro-optic device 1300 includes layers 1332, 1334, and 1336 that are analogous to layers 132, 134, and 136, respectively. Also shown is cladding 1340, which is analogous to cladding 140. Layers 1332, 1334, and 1336 may be TFLC electro-optic materials, such as TFLN and/or TFLT. The same or different electro-optic materials may be used for layers 1332, 1334, and/or 1336. The thicknesses of layers 1332, 1334, and/or 1336 may be analogous to that of layers 132, 134, and 136.

Electro-optic structure 1330 may have improved losses for transitions between different layers 1332, 1334, and 1336 of electro-optic material. For various electro-optic structures, including those herein, transitions between waveguides (i.e. layers) defined using different layers are desired to have low loss. Typically, low loss transitions are done with a long adiabatic taper. However, long tapers require large die area and can add excessive loss due to propagation length. Furthermore, completely adiabatic tapers may not be fabricable due to minimum resolvable feature sizes in fabrication. Electro-optic structure 1330 may achieve low losses without requiring the long, adiabatic taper. FIG. 13B depicts the portion of electro-optic structure 130 having a rib waveguide including layers 1334 and 1336 (rib waveguide 1336/1334). Thus, optical mode 1340 is well confined by rib waveguide 1336/1334. FIG. 13C depicts the portion of electro-optic structure 1330 having a rib waveguide that includes only layer 1334 (rib waveguide 1334). Thus, layer 1336 has been removed. In addition, the width of layer 1334 has been changed. For example, layer 1336 and a portion of layer 1334 may have been removed by an etch. Rib waveguide 1334 carries mode 1340' that corresponds to mode 1340. As can be seen in FIGS. 13B and 13C the rib waveguide 1336/1334 and rib waveguide 1334 are configured such that the width of mode 1340' of rib waveguide 1334 matches the width of mode 1340 of rib waveguide 1336/1334. In particular, the widths of layers 1336 and 1334 may be selected to control the profiles of modes 1340 and 1340' such that there is good, low-loss overlap (e.g., below 0.05 dB loss) between the modes. This means that layer 1336 may be terminated abruptly and non-adiabatically without introducing significant losses.

Electro-optic device 1300 may share the benefits of electro-optic device(s) 100, 200, 200', 300, 400, 500, 600, 700, 800, 900, 1000, 1100, and/or 1200. Electro-optic structures, such as structure 1330, within electro-optic device 1300 may be better configured for its purposes. For example, transitions between layers 1334 and 1336 may be achieved with low losses and without requiring long tapers. Low loss transitions between other layers may be achieved in an analogous manner. As a result, electro-optic device 1300 may have better overall performance. Higher complexity devices having the desired performance may be fabricated because each component may have an optimized configuration of the electro-optic material(s) in layers 1332, 1334, and 1336. Moreover, because TFLC may be processed with smoother sidewalls, lower optical losses may be achieved for electro-optic device 1300. Thus, performance of electro-optic device 1300 may be improved.

Figure 14:
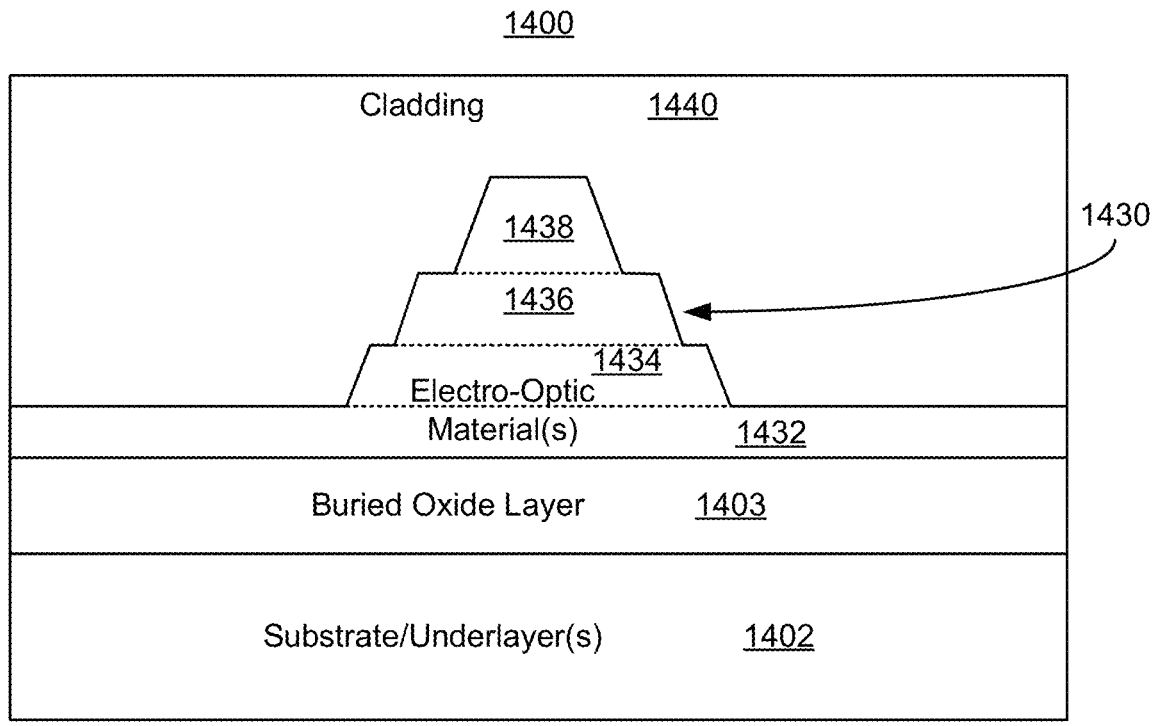
FIG. 14 depicts an embodiment of an electro-optic device that may have improved device performance.

FIG. 14 depicts an embodiment of an electro-optic device 1400 that may have improved device performance. FIG. 14 is a cross-sectional view of one region electro-optic device 1400. FIG. 14 is not to scale. Electro-optic device 1400 includes electro-optic structure 1430. Electro-optic device 1400 may include other and/or additional structures that are not shown for simplicity. Electro-optic device 1400 is analogous to electro-optic device(s) 100, 200, 200', 300, 400, 500, 600, 700, 800, 900, 1000, 1200, and/or 1300. Thus, electro-optic device 1400 is on a substrate structure that includes substrate 1402 and BOX layer 1403 that are analogous to substrate 102 and BOX layer 103. Electro-optic device 1400 includes layers 1432, 1434, and 1436 that are analogous to layers 132, 134, and 136, respectively. Also shown is cladding 1440, which is analogous to cladding 140. Layers 1432, 1434, and 1436 may be TFLC electro-optic materials, such as TFLN and/or TFLT. The same or different electro-optic materials may be used for layers 1432, 1434, and/or 1436. The thicknesses of layers 1432, 1434, and/or 1436 may be analogous to that of layers 132, 134, and 136.

Electro-optic device 1400 also includes an additional layer 1438. Electro-optic structure 1430 may be a waveguide including layers 1434, 1436, and 1438 in a rib waveguide. Layer 1432 may form a slab region. Through the use of additional layer 1438, finer control over structures in electro-optic device 1400 may be achieved. In some embodiments, additional layer(s) may be used.

Electro-optic device 1400 may share the benefits of electro-optic device(s) 100, 200, 200', 300, 400, 500, 600, 700, 800, 900, 1000, 1100, 1200, and/or 1300. Electro-optic structures, such as structure 1430, within electro-optic device 1400 may be better configured for its purposes. For example, finer control over electro-optic structures may be achieved. As a result, electro-optic device 1400 may have better overall performance. Higher complexity devices having the desired performance may be fabricated because each component may have an optimized configuration of the electro-optic material(s) in layers 1432, 1434, and 1436. Moreover, because TFLC may be processed with smoother sidewalls, lower optical losses may be achieved for electro-optic device 1400. Thus, performance of electro-optic device 1400 may be improved.

Figure 15:
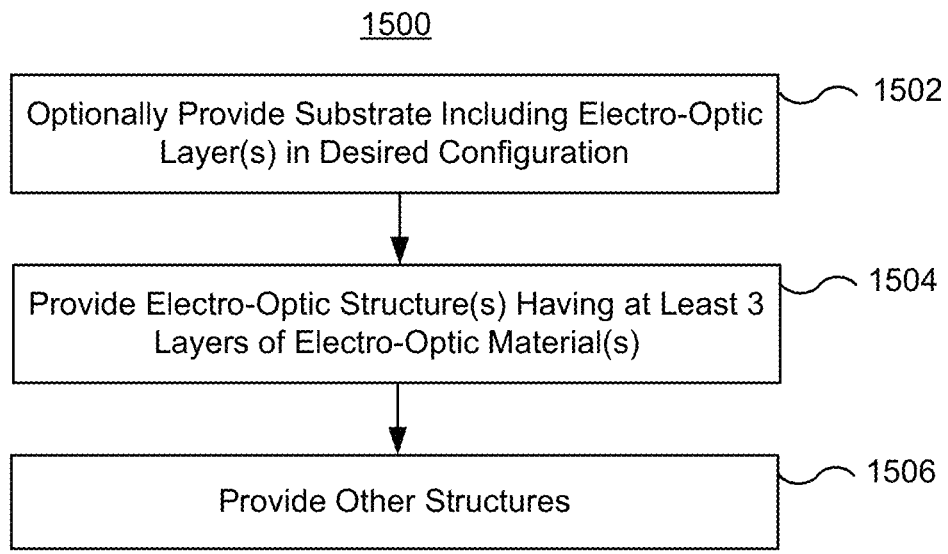
FIG. 15 is a flow chart depicting an embodiment of a method for fabricating an electro-optic device that may have improved performance.

FIG. 15 is a flow chart depicting an embodiment of method 1500 for fabricating an electro-optic device that may have improved performance. Method 1500 is described in the context of processes that may have sub-processes. Although described in a particular order, another order not inconsistent with the description herein may be utilized. Further, although described in the context of electro-optic device 100, method 1500 may be used to form other analogous electro-optic devices including but not limited to electro-optic devices 200, 200', 300, 400, 500, 600, 700, 800, 900, 1000, 1100, 1200, 1300, and/or 1400.

A substrate including one or more electro-optic layers in the desired configuration is optionally provided or obtained, at 1502. In some embodiments, 1502 may include use of a substrate including one or more layer(s) of electro-optic material(s) such as TFLC materials that are sufficiently thick to be etched into the desired number of layers. In some embodiments, 1502 may include obtaining and/or fabricating a substrate that includes layer(s) of electro-optic materials that are interleaved with dielectric layer(s).

At 1504, the electro-optic structure(s) having three or more layers formed of electro-optic material(s) are provided. For example, at least three etches may be performed. One or more of the etches (including all of the etches) may use different masks. Thus, at least three different layers of electro-optic material(s) are defined. In some embodiments, 1504 also includes defining electro-optic structures having fewer than three layers. For example, one or more of the etches may completely remove layer(s) in a portion of the electro-optic device being fabricated. Other structures are provided, at 1506. For example, electrodes, cladding bonding pads and/or other portions of the electro-optic device may be fabricated.

For example, a substrate including substrate 102, BOX layer 103, and enough electro-optic material(s) (e.g. TFLC layer(s)) to form layers 132, 134, and 136 is fabricated or obtained, at 1502. In some embodiments, the substrate may simply include a sufficiently thick TFLC layer to form layers 132, 134, and 136. Such a layer may have a thickness of at least t1+t2+t3.

At 1504, electro-optic structures 130 and 130' are formed. For example, layers 136, 134, and 132 may be etched in three etches to form the individual layers of electro-optic device 130. In addition, portions of layers 136 may be completely removed in one or more of these etches. In another embodiments, instead of processes 1502 and 1504, structures 130 and 130' may be fabricated via deposition and/or growth of layers 132, 134, and 136. Remaining structures for electro-optic device 100 are formed, at 1506. For example, electrodes 120 and cladding 140 may be formed.

Thus, using method 1500, electro-optic devices having the desired features may be formed. For example, greater control may be achieved over individual electro-optic structures formed on the device. Consequently, performance, robustness, and/or fabrication may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electro-optic device, comprising:
   a substrate structure;
   a first layer on the substrate structure and including a first thin film lithium-containing (TFLC) electro-optic material having a first thickness;
   a second layer on the first layer, the second layer including a second TFLC electro-optic material and having a second thickness; and
   a third layer on the second layer, the third layer including a third TFLC electro-optic material and having a third thickness;
   wherein at least one electro-optic structure of the electro-optic device includes the first layer, the second layer, and the third layer, the first layer having a first width in the at least one electro-optic structure, the second layer having a second width in the at least one electro-optic structure, and the third layer having a third width in the at least one electro-optic structure, the at least one electro-optic structure including a waveguide;
   wherein a portion of the waveguide is configured with a bend, the third layer being omitted at the bend, a TE0 to TM0 mode conversion being reduced.

2. The electro-optic device of claim 1, wherein the first layer has a first thickness of at least fifty nanometers and not more than three hundred and fifty nanometers, the second layer has a second thickness of at least two hundred and fifty nanometers and not more than five hundred nanometers, and wherein the third layer has a third thickness of at least three hundred and fifty nanometers and not more than 1.2 micrometers.

3. The electro-optic device of claim 2, wherein the first TFLC electro-optic material, the second TFLC electro-optic material, and the third TFLC electro-optic material each includes at least one of thin film lithium niobate and thin film lithium tantalate.

4. The electro-optic device of claim 1, further comprising:
   at least one dielectric layer having at least one location selected from between the first layer and the second layer and between the second layer and the third layer.

5. The electro-optic device of claim 1, wherein the at least one electro-optic structure includes at least one of a waveguide, a grating having a plurality of teeth, a mode converter, or a multi-mode interference coupler.

6. The electro-optic device of claim 5, wherein the at least one electro-optic structure includes the waveguide, the third width being less than the second width, and the second width being less than the first width.

7. The electro-optic device of claim 6, wherein the waveguide is a rib waveguide and wherein the first layer corresponds to a trench adjacent to the waveguide.

8. The electro-optic device of claim 6, further comprising:
   an electrode, a portion of the electrode being proximate to a portion of the waveguide;
   wherein the first layer extends to the electrode for at least the portion of the waveguide.

9. The electro-optic device of claim 6, further comprising:
   an electrode, a portion of the electrode being proximate to a portion of the waveguide;

wherein the third layer has the third thickness for the portion of the waveguide and a fourth thickness distal from the portion of the waveguide, the third thickness being greater than the fourth thickness and being at least five hundred nanometers and not more than eight hundred nanometers.

10. The electro-optic device of claim 6, wherein the waveguide includes a first portion having the first layer, the second layer, and the third layer, the waveguide also including a second portion having only the first layer and the second layer.

11. The electro-optic device of claim 6, wherein a portion of the waveguide is configured with a bend having a bending radius of less than forty micrometers and greater than ten micrometers, the first width being not more than one micrometer greater than the second width at the bend.

12. The electro-optic device of claim 5, wherein the at least one electro-optic structure includes the grating, wherein the second layer has a central axis, the third layer being offset from the central axis.

13. The electro-optic device of claim 1, wherein the at least one electro-optic structure includes an aperture extending through at least the first layer.

14. The electro-optic device of claim 1, further comprising:
an additional electro-optic structure, at least one of the additional electro-optic structure including only the first layer and the second layer or the additional electro-optic structure including only the first layer.

15. An electro-optic device, comprising:
a substrate structure;
a first electro-optic structure on the substrate structure, the first electro-optic structure including a first layer, a second layer on the first layer, and a third layer on the second layer, the first layer including a first thin film lithium-containing (TFLC) electro-optic material having a first thickness, the second layer including a second TFLC electro-optic material and having a second thickness, the third layer including a third TFLC electro-optic material and having a third thickness, the first electro-optic structure including a waveguide; and
a second electro-optic structure on the substrate structure, the second electro-optic structure including the first layer and at least a portion of the second layer but omitting the third layer, the second electro-optic structure including a bend in the waveguide, a TE0 to TM0 mode conversion being reduced for the second electro-optic structure.

16. The electro-optic device of claim 15, further comprising:
a third electro-optic structure including at least a portion of the first layer but omitting the second layer and the third layer.

17. A method, comprising:
providing at least one electro-optic structure from at least one lithium-containing electro-optic layer on a substrate structure, the at least one electro-optic structure including a waveguide, the providing the at least one electro-optic structure including performing at least three etches of the at least one lithium-containing electro-optic layer such that the at least one electro-optic structure includes a first layer, a second layer on the first layer, and a third layer on the second layer, the first layer including a first thin film lithium-containing (TFLC) electro-optic material having a first thickness, the second layer including a second TFLC electro-optic material and having a second thickness, the third layer including a third TFLC electro-optic material and having a third thickness, the at least one lithium-containing electro-optic layer including the first TFLC electro-optic material, the second TFLC electro-optic material, and the third TFLC electro-optic material;
wherein the first layer has a first width in the first electro-optic structure, the second layer has a second width in the at least one electro-optic structure, and the third layer has a third width in the at least one electro-optic structure; and
wherein a portion of the waveguide is configured with a bend, the third layer being omitted at the bend, a TE0 to TM0 mode conversion being reduced.

18. The method of claim 17, wherein the second TFLC electro-optic material is the same as the first TFLC electro-optic material, and the third TFLC electro-optic material is the same as the first TFLC electro-optic material.

19. The method of claim 18, further comprising:
providing at least one dielectric layer having at least one location selected from between the first layer and the second layer and between the second layer and the third layer.

* * * * *